United States Patent [19]
Beland

[11] Patent Number: 5,966,425
[45] Date of Patent: *Oct. 12, 1999

[54] APPARATUS AND METHOD FOR AUTOMATIC X-RAY CONTROL

[75] Inventor: Robert Beland, Bellefeuille, Canada

[73] Assignee: Electromed International, Quebec, Canada

[*] Notice: This patent is subject to a terminal disclaimer.

[21] Appl. No.: 08/081,081

[22] Filed: Jun. 22, 1993

Related U.S. Application Data

[63] Continuation-in-part of application No. 07/931,899, Aug. 18, 1992, Pat. No. 5,241,260, which is a continuation of application No. 07/467,658, Jan. 19, 1990, abandoned, which is a continuation-in-part of application No. 07/447,559, Dec. 7, 1989, Pat. No. 5,023,769, application No. 07/447,388, Dec. 7, 1989, Pat. No. 5,056,125, and application No. 07/447,389, Dec. 7, 1989, abandoned.

[51] Int. Cl.⁶ .................................................. H05G 1/44
[52] U.S. Cl. ................................................ 378/108; 378/97
[58] Field of Search ...................................... 378/108, 97

[56] References Cited

U.S. PATENT DOCUMENTS

| | | | |
|---|---|---|---|
| 3,551,788 | 12/1970 | Summer | 323/22 |
| 3,894,235 | 7/1975 | Franke | 378/108 |
| 3,911,273 | 10/1975 | Franke | 378/108 |
| 4,034,283 | 7/1977 | Pellegrino | 323/74 |
| 4,097,741 | 6/1978 | Pfeiler | 378/108 |
| 4,119,856 | 10/1978 | Franke | 250/402 |
| 4,200,795 | 4/1980 | Kawamura et al. | 378/101 |
| 4,274,003 | 6/1981 | Kuehnel et al. | 250/409 |
| 4,277,683 | 7/1981 | Schmitmann | 250/402 |
| 4,309,612 | 1/1982 | Aichinger | 378/108 |
| 4,400,660 | 8/1983 | Schaefer | 323/270 |
| 4,412,183 | 10/1983 | Brodie | 330/68 |
| 4,449,227 | 5/1984 | Osako | 378/112 |
| 4,649,558 | 3/1987 | Brunn et al. | 378/108 |
| 4,670,893 | 6/1987 | Tsuchiya | 378/105 |
| 4,731,803 | 3/1988 | Kranberg et al. | 378/114 |
| 4,739,466 | 4/1988 | Glennon et al. | 363/89 |
| 4,796,286 | 1/1989 | Ochmann et al. | 378/108 |
| 4,816,741 | 3/1989 | Estrand | 323/297 |
| 4,845,771 | 7/1989 | Wislocke et al. | 378/108 |
| 4,870,534 | 9/1989 | Harford | 361/58 |
| 5,008,913 | 4/1991 | Negle | 378/105 |
| 5,023,769 | 6/1991 | Beland | 363/86 |
| 5,056,125 | 10/1991 | Beland | 378/101 |
| 5,070,538 | 12/1991 | Milberger et al. | 455/126 |
| 5,132,999 | 7/1992 | Wirth | 378/101 |
| 5,241,260 | 8/1993 | Beland | 323/270 |

FOREIGN PATENT DOCUMENTS

| | | |
|---|---|---|
| 0 279 317 | 8/1988 | Germany. |
| 55-151794 | 11/1980 | Japan. |
| 61-27099 | 2/1986 | Japan. |
| 220785 | 8/1924 | United Kingdom. |

Primary Examiner—Craig E. Church
Attorney, Agent, or Firm—Wolf, Greenfield & Sacks, P.C.

[57] ABSTRACT

A high-voltage power supply and regulator circuit for an X-ray tube which utilizes solid-state switching devices with feedback control for real time monitoring and protection against failure due to excess current or voltage spikes. The apparatus includes a DC supply circuit utilizing a first feedback control loop and silicon controlled rectifiers to regulate the output of a high-voltage transformer. The apparatus further includes a regulator circuit utilizing a second feedback control loop and a series of FETs to produce a continuous or pulsed output of precise magnitude and phase. Shielded voltage dividers are provided to accurately measure the voltage outputs and produce feedback control signals. Discharge modules on the high-voltage cables connecting the power supplying X-ray tube discharge any capacitive voltage remaining on the cables between pulses, so as to eliminate any tail on the output waveform. A current measuring apparatus and excess current detector are provided to protect against excess currents. Patient dosage feedback is derived from an X-ray exposure sensor placed behind the patient receiving the X-ray radiation. At one or more times during the initial exposure period, the output of the X-ray tube is modified in order to obtain a 100% density image while minimizing the patient exposure.

33 Claims, 19 Drawing Sheets

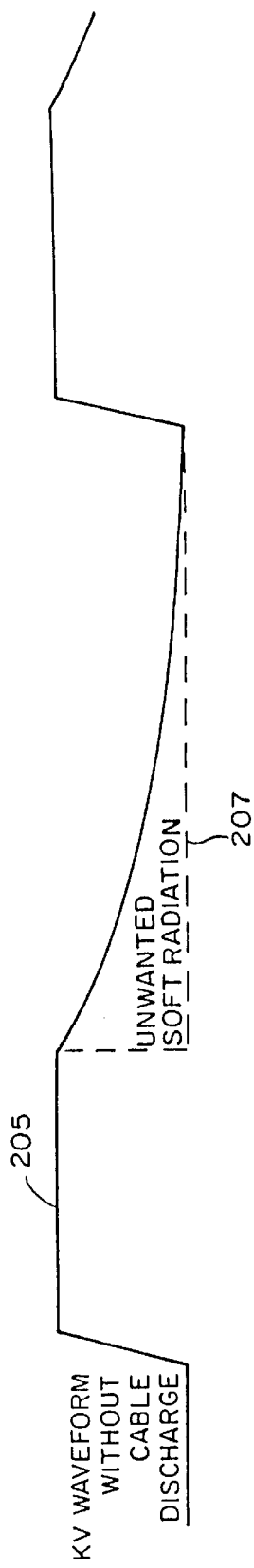

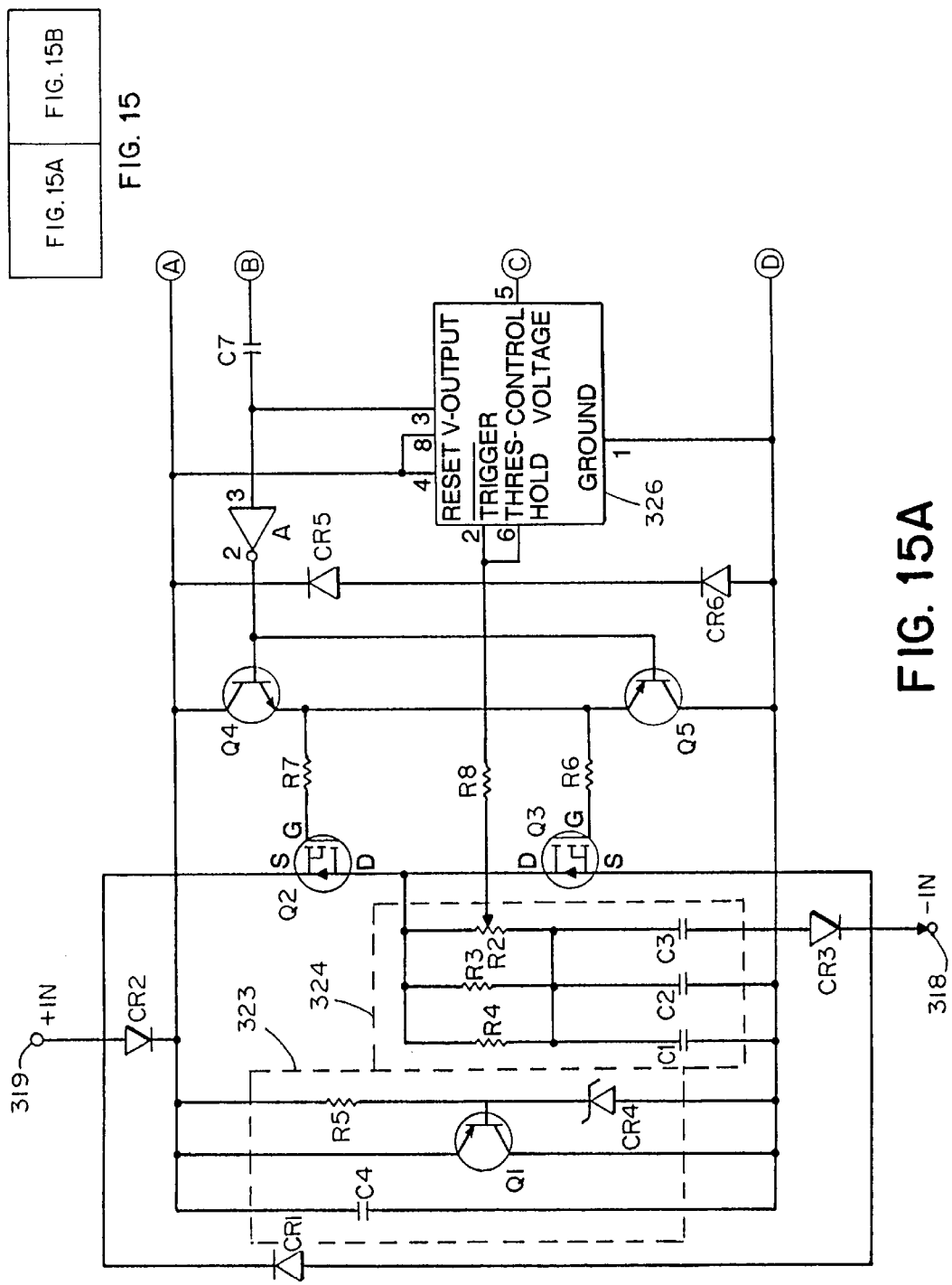

APPARATUS AND METHOD FOR AUTOMATIC X-RAY CONTROL

CROSS-REFERENCES TO RELATED APPLICATIONS

This application is a continuation-in-part of and commonly-owned U.S. Ser. No. 07/931,899 filed on Aug. 18, 1992, entitled "High Voltage Power Supply And Regulator Circuit For An X-Ray Tube With Closed Loop Feedback For Controlling X-Ray Exposure," (now U.S. Pat. No. 5,241,260) which in turn is a continuation of Ser. No. 07/467,658 filed Jan. 19, 1990 (now abandoned), which in turn is a continuation-in-part of three applications filed on Dec. 7, 1989: Ser. No. 07/447,559 entitled X-Ray Tube High-Voltage Power Supply With Control Loop And Shielded Voltage Divider (now U.S. Pat. No. 5,023,769); Ser. No. 07/447,388 entitled Discharge Module For X-Ray Cable (now U.S. Pat. No. 5,056,125); and Ser. No. 07/447,389 entitled X-Ray Tube Current Measuring Apparatus (now abandoned).

BACKGROUND OF THE INVENTION

The present invention relates in general to an apparatus for powering X-ray tubes. In particular, the present invention uses solid-state switching and closed loop feedback control to automatically control the X-ray exposure. The invention may be correctly used by operators having a minimal skill level.

Typical high-voltage power supplies utilize vacuum tubes, variacs, auto transformers, tetrodes, and/or triodes for regulating the high-voltage output supplied to an X-ray tube. These devices have not been totally satisfactory due to their relatively high cost, slow response speed, lack of reliability, and/or their inability to provide a pulsed waveform having minimum ripple, fast rise time, and fast fall time. Prior attempts have been made to utilize solid-state switching devices, such as a series of field effect transistors (FETs), to regulate the high-voltage output. However, these have met with limited success because of the low-power rating of commercially available transistors and their inability to survive voltage spikes caused by an X-ray tube arc-over.

In a conventional X-ray tube, X-rays are produced by generating electrons by thermionic emission from a tungsten filament (cathode). The electrons are then accelerated to an anode (which may be rotating for wear-averaging purposes) to generate the X-rays. The emission intensity of the tube is controlled by the filament current and by the difference in potential between the anode and cathode.

Current X-ray tubes operate at potentials of up to 200 kV. A high-voltage power supply utilizing a step-up transformer is required to raise the available AC line voltage to this level. X-ray tube power supplies having a DC supply circuit, 90, as shown in FIG. 1 have been employed in prior known devices. The typical AC line voltage available in hospitals and clinics varies from single-phase 220 volts AC to three-phase 600 volts AC. An X-ray power supply able to operate from widely different line voltages, phases and impedances would be desirable in that line matching of the transformer to the specific AC line voltage characteristics would not be required.

Precise control of the voltage and phase of the power supplied to an X-ray tube is important to ensure proper imaging for diagnostic purposes and to avoid unnecessary exposure of the patient to X-ray radiation which does not produce a usable image. For example, during a conventional radiographic gastrointestinal analysis, the patient ingests a radioopaque liquid containing barium. When the patient ingests the liquid, the doctor turns on the X-ray generating tube at a low level and positions the patient between the X-ray tube and a fluoroscopic screen. The doctor analyzes the patient's gastrointestinal tract while the barium flows through it. When the doctor sees a part of the procedure he wants to record, he typically replaces the fluoroscopic screen with a photographic plate and increases the X-ray to a level intense enough to expose the plate.

High operating voltages make control of the X-ray tube emission level a difficult problem, typically requiring expensive components. Furthermore, at high tube currents the voltage can fall very quickly, making precise measurement of the voltage difficult. Still further, at high voltages stray capacitive coupling occurs which prevents accurate measurement of the tube voltage. Regulator circuits using FET's in series in X-ray tube power supplies have been employed in prior art devices. The combination of FET's in series regulator circuits with the protection, drive and feedback circuits of the embodiment of FIG. 1 is quite novel, however, and the specific configuration of the regulator circuit 91, FIG. 1, is also quite novel.

Precise phase control is also important when an X-ray image is to be recorded by a television camera. TV cameras have well-established sweep rates to which the X-ray exposure must be synchronized. If the exposure is not synchronized, the resulting picture from the TV camera has an interference pattern or jitters, which will make the picture very difficult or impossible to view. An exposure synchronized with the 60 Hz sweep rate of the TV camera will produce a coherent picture. It is also permissible to use X-ray exposures of less frequent multiples of the 60 Hz rate, for example, 30, 15 or 7.5 Hz.

Single-phase and three-phase power supplies each have certain advantages, depending upon the exposure rate desired. For example, three-phase power supplies are commonly employed to provide continuous X-ray emissions, because the voltage ripple in the rectified signal is smaller. Filtering capacitors to eliminate ripple are generally impractical at the high voltages employed and interfere with switching on-off times. In contrast, single-phase supplies are generally used to provide a short pulsed emission.

It would thus be desirable to provide a high-voltage power supply for both continuous and pulsed X-ray emissions which provides a precisely controlled output voltage and which accommodates variations in the input AC line voltage.

When an X-ray tube is being used for applications such as cardiac angiography, the X-ray tube is operated in relatively short bursts at a relatively high frequency in order to obtain clear images and to be able to monitor heart activity and detect any abnormalities. Typically, the tube is operated at approximately 8 ms bursts.

The relatively small X-ray tube current produced with pulsed fluroscopy does not sufficiently discharge the capacitance of the high-voltage cables connecting the power supply and X-ray tube between exposure frames. The "tail" on the power supply output waveform produces unwanted soft radiation which adds to the patient dose and does not improve the image. It would thus be desirable to provide a high-voltage power supply for an X-ray tube which produced substantially rectangular waveforms without a trailing tail of unwanted soft radiation.

In a conventional technique for measuring the X-ray tube current, the anode and cathode power supply lines are separated, with one supply return tied to ground and the other supply return tied to ground through a small value resistor in order to measure the "midpoint" current. However, the accuracy of this measurement technique is adversely affected by high-tension transformer leakage current and various stray capacitive currents. It would be desirable to provide an apparatus for precisely measuring X-ray tube current which is not affected by these leakage and stray capacitive currents.

It is generally difficult to measure the true X-ray tube current with a measuring circuit placed in either the anode or the cathode circuit because these circuits are both at potentials of up to 100 kV away from ground and there is no low-voltage power supply available. It would be desirable to provide a measuring circuit which is powered by the X-ray tube current it is measuring and which is capable of sending accurate information across the 100 kV boundary.

Still further, although X-ray tube currents for pulsed fluoroscopy may be relatively small, i.e., 0.5 milliamps (ma), X-ray tube currents may be as high as 1200 ma during full exposures. The X-ray tube current thus ranges from 0.5 ma to 1200 ma. As a result, the measuring circuit must be linear over a 2400 to 1 dynamic range. It would be desirable to provide a current measuring apparatus which is linear over this dynamic range and which operates with only 0.5 ma available as a supply current.

As noted above, the use and control of high-voltage power is inherent in the operation of conventional X-ray tubes. As such, various circuit components which are the same or similar to a variety of individual components shown in the Figures such as voltage divider 5, filament drive 73, current measurer 320 and discharge modules 210A, B, FIG. 1, have been employed in prior X-ray power supply devices. The combination of such components and the configuration of such components and the configurations of elements such as 210 as in the present invention is quite novel, however.

Thus, it is an object of this invention to provide a high-voltage regulated power supply for an X-ray tube that provides a precisely controlled voltage waveform in order to avoid overexposing the patient to excessive radiation or underexposing the X-ray image.

Another object is to provide a regulated power supply utilizing solid-state switching devices having a fast response time to enable real time control of the patient X-ray dosage.

Yet another object is to provide a regulated power supply having protective circuitry to guard against damage from excessive current or voltage transients.

Still another object is to provide an X-ray apparatus that automatically adjusts X-ray exposure without the aid of an X-ray technician to assure properly exposed X-ray images for patients having widely varying body sizes.

Still another object is to provide an X-ray apparatus that can automatically adjust X-ray exposure during the actual exposure time.

Still another object is to provide an X-ray apparatus in which X-ray tube current and voltage may be adjusted under load.

SUMMARY OF THE INVENTION

The apparatus and method of this invention automatically adjusts the amplitude and/or duration of the X-ray tube voltage during an initial part of the exposure to insure a properly exposed X-ray image (i.e., substantially 100% density) while minimizing the exposure of the patient. It automatically compensates for patients of varying body size, and in a preferred embodiment allows an adjustment of the tube voltage from 40 kV to 150 kV in a maximum of 20% of a nominal exposure time of 100 milliseconds.

The automatic exposure control apparatus of this invention is preferably utilized in conjunction with a power supply having solid-state switching devices with feedback control for producing a precisely regulated output voltage waveform with a fast rise time. The apparatus includes a DC supply circuit utilizing a first feedback control loop and silicon controlled rectifiers to regulate the output of a high-voltage transformer. The apparatus further includes a regulator circuit utilizing a second feedback control loop and a series of field effect transistors (FETs) to produce a continuous or pulsed output of precise magnitude and phase. Shielded voltage dividers are provided for accurately measuring the voltage outputs of the high-voltage transformer and FET series and producing the feedback control signals. The FET series is protected against transient voltage spikes caused by tube arc-over. Any capacitive voltage remaining on the high-voltage cables connecting the power supply and X-ray tube is discharged between pulses to produce a pulsed waveform having a fast fall time. A current measuring apparatus is provided at the output of the high-voltage transformer to protect against excessive tube current and to provide current feedback information for use in controlling the X-ray tube current.

The patient dosage feedback for automatically controlling the DC supply and regulator circuits during an exposure is derived from an X-ray exposure sensor placed behind the patient receiving the X-ray radiation. The sensor measures the amount of radiation passing through the patient and reaching the film or other imaging device. In one embodiment, the output of the sensor is integrated to produce an exposure rate curve. At one or more times during the initial part of the exposure period, this curve is monitored to determine whether the optimum exposure rate will be achieved, and if not the output of the power supply is modified to approach the desired rate.

BRIEF DESCRIPTION OF THE DRAWINGS

FIGS. 10A–10B are waveforms showing the voltage applied to the X-ray tube without and with the discharge module of this invention, respectively.

DETAILED DESCRIPTION OF THE PREFERRED EMBODIMENTS

1. The Complete High-Voltage Supply And Regulator Circuit

Figure 1:
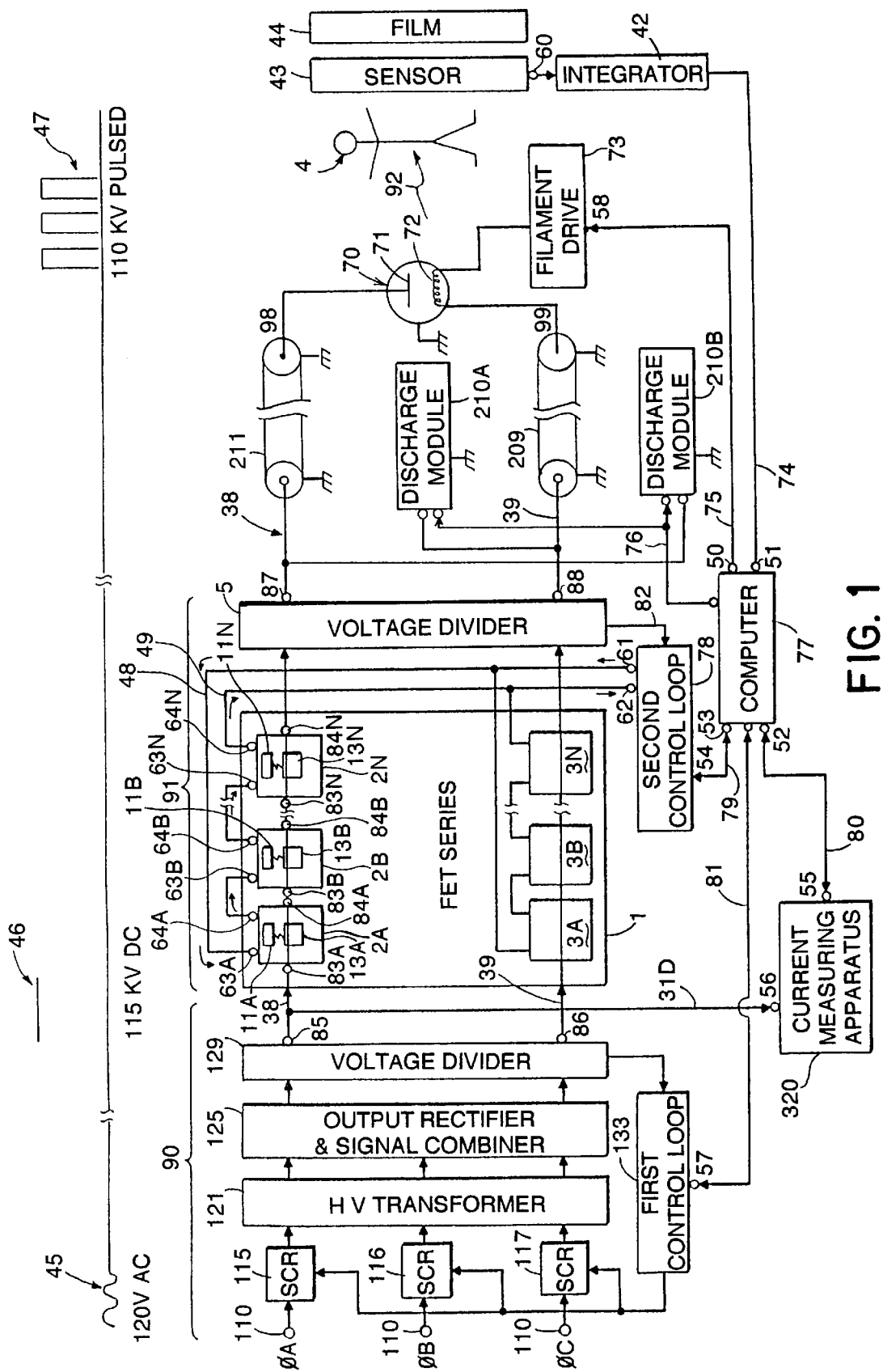
FIG. 1 is a block diagram of a high-voltage power supply and regulator circuit constructed in accordance with the present invention.

FIG. 1 is a block diagram showing an embodiment of a complete high-voltage power supply and regulator circuit according to the invention. The circuit is designed to limit the amount of X-ray exposure delivered to a patient 4 while providing a high-quality X-ray image. The image may be provided on film 44 as shown or, alternatively, on a TV screen or other imaging device with appropriate synchronization and interface apparatus.

The circuit utilizes a solid-state regulation system to control the high-voltage signal, e.g., 30,000 to 200,000 volts, provided to an X-ray tube. The regulation system is able to utilize FET. power transistors that have only a 500 to 1,000 volt rating, the maximum commercially available, by connecting the power transistors in series and by providing protective circuitry that prevents a chain failure if one device fails. In addition, protective circuitry detects the transistor chip temperature, the maximum load current, and limits the dissipated power on a shorted load. The system is also designed to assure proper voltage balance between all devices under static and dynamic conditions.

X-ray tubes have a tendency to arc-over, which produces an extremely fast voltage discharge and severe standing waves in the coaxial cables connecting the regulator circuit to the X-ray tube. These standing waves cause the voltage to double for a short time and reverse in polarity. This effect must be isolated from the regulator or the chain of power transistors utilized in this invention could not remain in balance and could not survive the instantaneous overvoltage.

As shown in FIG. 1, the system includes the following circuit portions connected in series between input terminals 110 and X-ray tube 70: a DC supply circuit 90 having a first feedback control loop 133; a regulator circuit 91 having a second feedback control loop 78; a current measuring circuit 320 between the supply circuit 90 and regulator circuit 91; and a pair of discharge modules 210A and 210B on coaxial cables 211 and 209 connected to the X-ray tube. The feedback control loops include a shielded voltage divider for supplying an accurate low-voltage feedback signal and protective devices to prevent damage to the solid-state switching devices from transient voltage spikes or reversals of polarity. The X-ray tube 70 transmits an X-ray signal 92 to a patient 4 who is positioned between the X-ray tube and an X-ray exposure sensor 43, with film 44 disposed on the opposite side of sensor 43. The sensor 43 sends a feedback signal to computer 77 via integrator 42 which indicates the total X-ray exposure passing through the patient and reaching film 44 for producing an X-ray image. The current measuring apparatus 320 monitors the current in the X-ray tube and sends a feedback signal to the computer 77 to prevent excessive current from damaging the DC supply and regulator circuits or the X-ray tube and provides accurate feedback information used by the system to precisely control the X-ray tube current. The computer 77 in turn controls the first control loop 133, second control loop 78, discharge modules 210A and 210B, and filament drive 73. Filament drive 73 determines the current in the cathode filament and thus, along with the potential across the anode 71 and cathode 72, determines the magnitude of the X-ray exposure signal 92.

As shown at the top of FIG. 1, an input signal 45, which may be, for example, a three-phase sinusoidal 120V AC signal, is input at terminals 110. The output of the DC supply at terminals 85, 86 is a stepped-up constant voltage signal 46 of for example 115 kV. The output at terminals 98, 99 of the high-voltage cables may be any continuous or intermittent (pulsed, sinusoidal, triangular, or the like) waveform as determined by the desired X-ray exposure, such as a pulsed 110 kV DC signal 47. The signal 46 is generally set slightly above the desired output signal 47 to account for any losses in the system.

The various portions of the apparatus of this invention are described below under separate subheadings.

2. The Regulator Circuit And Second Control Loop

As shown in FIG. 1, a high-voltage DC signal 46 at terminals 85, 86 is fed to FET series 1, comprising a first series of regulator modules 2A–2N on the positive (anode) line 38 and a second series of modules 3A–3N on the negative (cathode) line 39. The voltage across the two lines is floating, with neither line tied to ground. The quantity of modules is determined by the maximum input voltage 46 divided by the breakdown voltage of each module, with some additional modules added for a safety margin.

Each of modules 2A–2N and 3A–3N functions as a variable high-voltage power zener with two terminal isolation. The modules are provided in series so that if one module fails, that failure does not render the other modules inoperative. If one module fails, the total voltage from input to output of the regulator series is divided between all of the other modules. The following description will refer to the FET series 2A–2N, where it is understood that the series 3A–3N operates in an identical manner.

The modules 2A–2N are driven in series by an input current of from 0 to 100 ma received from the second control loop 78, which loop may be a digital control loop so that the control loop may respond with the required speed. The voltage across each module varies from about 10,000 volts to 0 volts, depending upon the input current. For a given input current, all of the modules in series (the functioning ones) share the voltage equally. A series circuit is formed by second control loop 78 and the series of modules 2A–2N. The output from the control loop 78 at terminal 61 is sent on line 48 and received in series at input terminals 63A–63N of modules 2A–2N. The serial output of modules 2A–2N at terminals 64A–64N is sent on line 49 to input terminal 62 on control loop 78.

Second control loop 78 and voltage divider 5 provided in the regulator circuit operate in substantially the same manner as first control loop 133 and voltage divider 129 provided in the DC supply circuit; the latter are described hereinafter under the subheading "DC Supply And First Control Loop." The voltage divider 5 provides a signal (on line 82) representative of the magnitude of the output voltage of FET series 1 to the second control loop 78 in order to provide feedback control for regulating the output of the FET series. The second control loop is connected via line 79 and terminal 54 to terminal 53 of computer 77. The computer 77 informs control loop 78 of the desired X-ray exposure rate, in order to adjust the output of regulator 91 at terminals 87, 88. It also instructs control loop 78 to terminate the output of regulator 91 when the X-ray exposure has been completed, or if excessive tube current is detected by module 210A or 210B.

Transient protection devices are provided for protecting FET series 1 from a reversal of polarity or a fast discharge rate voltage spike. These protection devices are described more fully hereinafter in conjunction with the shielded voltage divider 129. Clamp diodes are provided to prevent the modules from being submitted to a reverse polarity caused by an X-ray tube arc-over and any standing waves in the high-voltage cables 211, 209. To control the rate of a high-voltage discharge caused by an X-ray tube arc-over, an inductor/capacitor (LC) tuned circuit is provided on each of lines 38, 39 respectively to limit the transient voltage rate that the regulator sees to the resonant frequency of L/C. This is set for approximately 100,000 Hz resonance so as to limit the transient rise time to about 2.5 microseconds ($\mu$s) (as compared to about 0.002 $\mu$s for an unmodified high-voltage spike). The inductors are of special design in order to withstand the 100,000 volt transient across them without arc-over. The inductor coil is wound to a length of approximately 12 inches with a few thousand turns. The voltage per turn is as low as about 100 volts per turn.

In order to reduce any "tail" on the pulsed DC waveform 47, which soft radiation adds to the patient dose without improving the image, a pair of discharge modules 210A, 210B are provided on each of the high-voltage cables 211, 209 between the FET series 1 and the X-ray tube 70. The operation of these devices is described hereinafter under the subheading "Discharge Modules."

Figure 2:
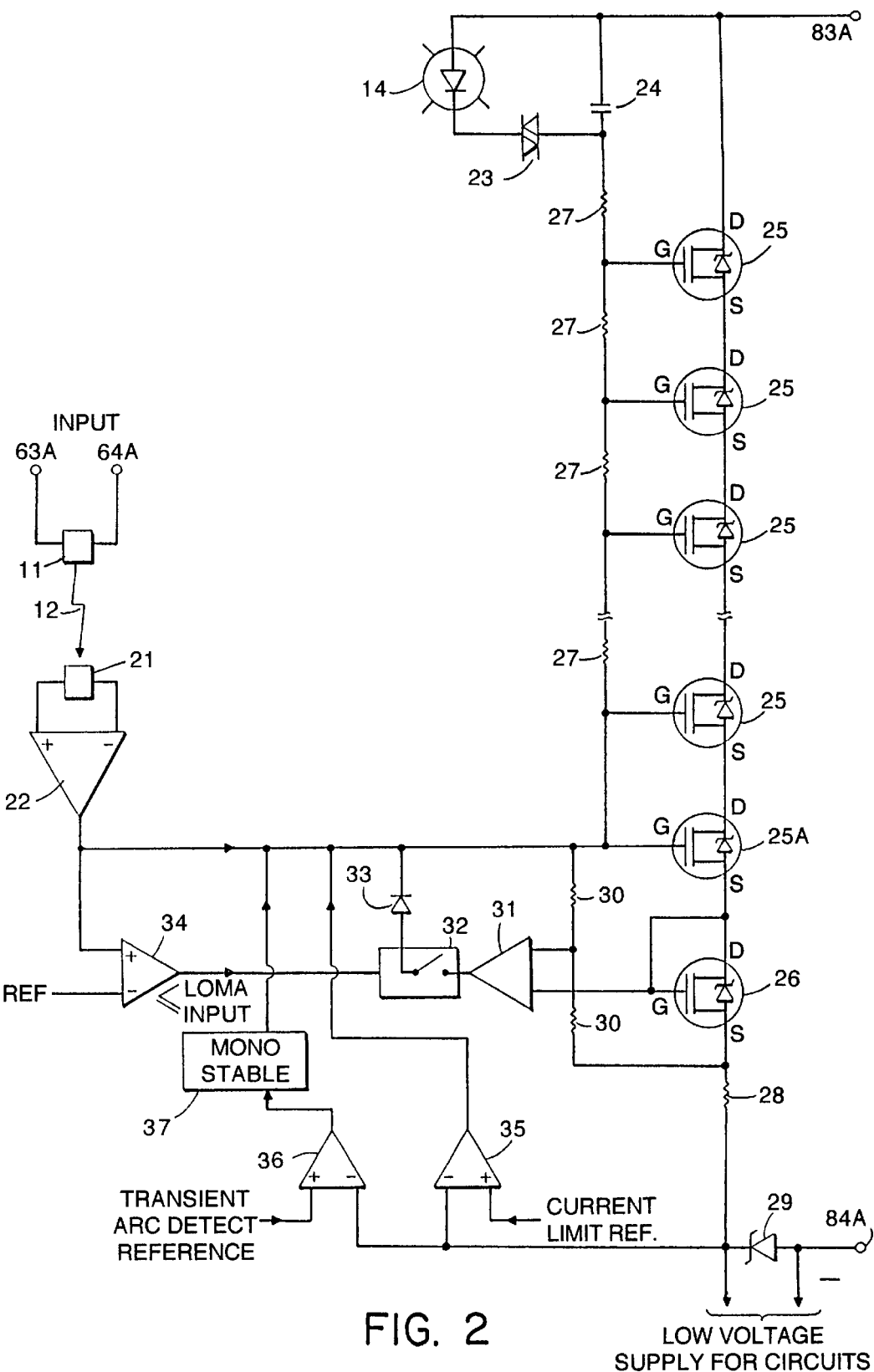
FIG. 2 is a detailed diagram of one module of the regulator and switching circuit.

As shown in FIG. 2, each of the modules 2A–2N and 3A–3N includes an electromagnetic (EM) coupling means 11 for isolating the low-voltage second control loop 78 from the high-voltage signal across the FET series. For example, it is shown in the art how to provide EM coupling at radio frequencies. The input current at terminal 63A activates an EM transmitting means 11. The EM signal 12 is coupled by appropriate means to an EM receiving means 21 which converts the EM signal into a current proportionally.

The current from receiving means 21 is amplified by amplifier 22 which in turns supplies current into a feedback and static-balancing resistor chain 27. The chain 27 is a feedback resistor from input terminal 83A to the gate G of a controlling transistor 25A, so that the voltage across terminals 83A, 84A is the product of the current generated by amplifier 22 times the sum of the resistances of all the resistors 27. All of resistors 27 have equal values, and therefore all transistors 25 have equal voltage across them. Each of transistors 25 and 25A is a field effect power transistor (FET).

When the drive current at terminals 63A, 64A exceeds a predetermined minimum, a comparator 34, which receives as inputs a reference signal and the output of amplifier 22, generates a signal to enable a "thermal limiter" which prevents the FET chips from exceeding a predetermined temperature. When the junction temperature of transistor 25A reaches a predetermined value, the thermal limiter is actuated to limit the current through transistors 25 to a predetermined level. The enable signal of comparator 34 is required because at very low input drive currents, if the thermal limiter clamps the regulator to the predetermined current, control of the regulator from amplifier 22 is lost. Thus, if the drive signal from 11 was to be shut off, the regulator would not turn off. Comparator 34 senses when there is less than a predetermined minimum drive, and disables the thermal limiter.

The thermal limiter includes, as shown in FIG. 2: enable comparator 34; enable gate 32; low temperature blocking diode 33; thermal limiter comparator 31; and two bridge comparator resistors 30. While an FET has a known gate voltage change with temperature, the difficulty in compensating for this change lies in the fact that the gate voltage changes more with load (i.e., X-ray tube) current than with temperature. In order to eliminate the gate voltage/load current effect, another transistor 26 (of the same type as 25A) is provided in the chain and, by connecting the gate and drain of transistor 26 together, the power across 26 is very low because the voltage across the drain to source (i.e., across the device) is equal to the gate voltage. Because the load current also passes through 26 and 25A, the gate voltages of 25A and 26 are always equal. Therefore, the gate voltage of transistor 26 can be subtracted from the voltage at the junction of bridge resistors 30 connected to the gate of transistor 25A to give 0 reading.

This type of connection of transistor 26 cancels the large effect of changing gate voltage with changing load current. Consequently, the smaller effect of changing gate voltage with temperature can be detected by transistor 26. Transistor 26 effectively tracks the junction temperature of transistor 25A and may therefore be used to drive thermal limiter comparator 31 on when the gate voltage of transistor 26 exceeds the voltage at the junction of bridge resistors 30. The output of thermal limiter comparator 31, through enable gate 32 and blocking diode 33, effectively limits the drive voltage and current supplied to the gate of transistor 25A which in turn limits the current (and as a consequence the junction temperatures of) transistors 25.

The power dissipation of transistor 25A is large compared to that of transistor 26 because 25A sees part of the voltage across the output terminals 83A, 84A. The resultant difference of the gate voltages 25A and 26 is only the thermal junction temperature difference between 25A and 26. Because 26 has very small dissipation and does not heat, by sensing this difference with amplifier 31 and controlling 25A via gate 32 and blocking diode 33, the junction temperature of 26 is limited to the desired value, i.e., output of comparator 31=(thermal junction temperature difference of transistors 25A and 26)×(the gain of comparator 31).

Current limiting is accomplished by sensing the voltage across current sensing resistor 28, which is in series with the load current. When the load (i.e., X-ray tube) current reaches a predetermined minimum, the output of comparator 35 turns transistor 25A off, which in turn increases the voltage across terminals 83A and 84A. The current sense point is "soft" in that the predetermined current value starts to increase the voltage across terminals 83A and 84A to a predetermined maximum value. In the linear zone between the predetermined minimum X-ray tube current and maximum voltage across terminals 83A and 84A, the voltage remains balanced across all regulator modules when within the current limit.

During an X-ray tube arc-over, a transient current is present for a very short time, approximately 2.5 $\mu$s. This transient is sensed by amplifier 36 and triggers a monostable circuit device 37 for turning off the regulator for a given time. After this monostable delay, the regulator reverts to normal operation. The normal response time for the regulator is about 100 $\mu$s maximum, and therefore amplifier 36 does not come into operation under normal conditions.

Zener diode 29 is in series with the load (X-ray tube) and serves to supply all of the low-voltage amplifiers around transistor 25A. When the module fails, the chain of transistors 25 acts as a short circuit (whether or not the module is on) between terminals 83A, 84A, except for a nominal voltage drop across diode 29. The remaining functioning modules then share the voltage equally.

Indicator 14 is a variable rate flasher which indicates the voltage present across terminals 83A, 84A. This provides the X-ray operator with a visual display on the proper functioning of each regulator module. Because each module shares the voltage equally, all indicators in each module should flash at the same rate. If not, one module is defective. The timing capacitor 24 is used to provide a signal to four-layer switching device 23 to control the on/off switching of indicator 14.

3. X-Ray Exposure Sensor

A sensor 43 is provided between patient 4 and film 44 for determining the amount of X-ray exposure emanating from the patient and exposing the film. As previously indicated, it is desired to minimize the X-ray exposure of the patient while still providing sufficient transmitted radiation for exposing the film. Sensor 43 is a conventional mechanism such as an image intensifier and associated mechanisms and emits at terminal 60 a signal proportional to the amount of X-rays passing through the patient. This signal is integrated by integrator 42 and sent to computer 77 at input terminal 51. The feedback from sensor 43 enables a readjustment of the X-ray signal sent to the patient one or more times during a given exposure in order to optimize the image produced on film 44 while limiting the total exposure of the patient. This is illustrated by the graphs shown in FIGS. 3A–3C.

Figure 3A:
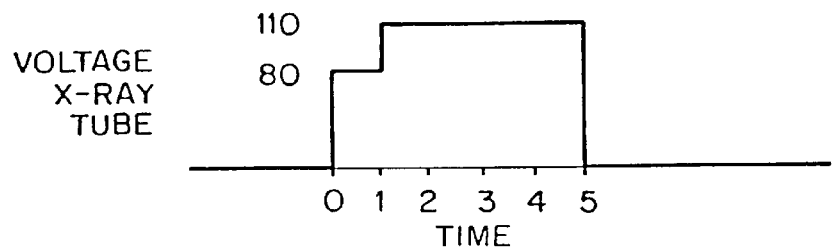
FIGS. 3A–3C are graphs showing the variation of X-ray exposure with time according to this invention so as to optimize the exposure rate.
Figure 3B:
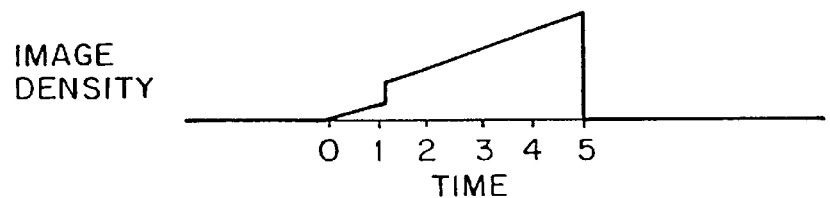
Figure 3C:
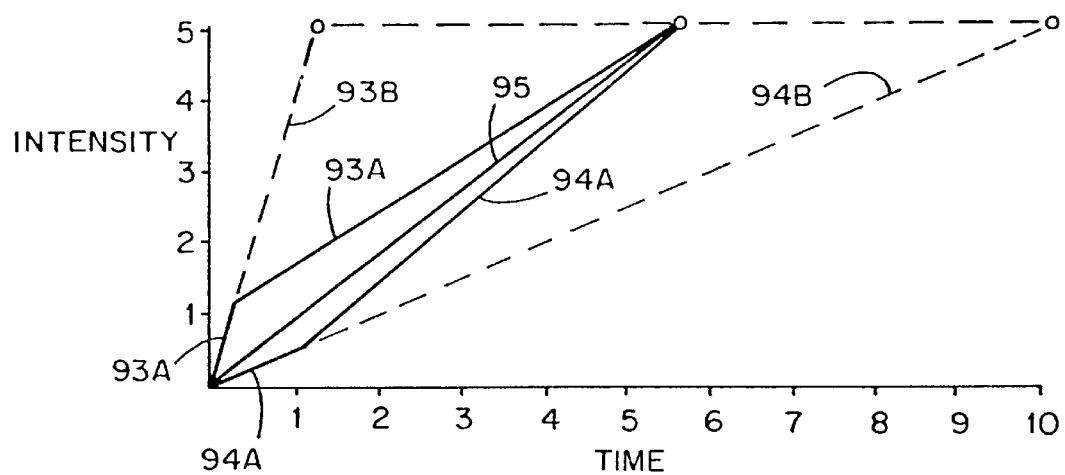

FIG. 3A shows the voltage at the X-ray tube 70 versus time, the time scale being divided into five equal units. FIG. 3B shows an image density curve on the same time scale as FIG. 3A corresponding to an X-ray exposure using the X-ray tube voltages illustrated in FIG. 3A. FIG. 3C shows the X-ray intensity at sensor 43 versus time.

In a representative example, a person of average build, i.e., an adult male weighing about 180 lbs, may receive the proper exposure, e.g., 5 units of intensity within 5 units of time (curve 95), with an X-ray tube voltage of 100 kV. A person of greater size would absorb more X-ray energy and thus not transmit sufficient energy for an optimum image at 5 units of time (curve 94B). In contrast, a person of smaller size would absorb less X-ray energy and transmit excessive X-ray energy to the film (curve 93B). Because the exact patient absorption cannot be determined beforehand simply on the basis of weight, it is desired to estimate the appropriate tube voltage, set the initial tube voltage slightly lower to avoid excess exposure, and then automatically readjust the tube voltage one or more times during the exposure as needed to approximate the ideal exposure.

In this example, where a patient is expected to have proper absorption at a 100 kV tube voltage, the initial tube voltage is set below that level, e.g., 80 kV at time zero. Sensor 43 designates when the received intensity is either one unit of intensity or one unit of time, whichever occurs first. As shown in FIG. 3C, for a smaller patient the intensity unit 1 would be reached first (curve 93A) and for a larger patient the time unit 1 would be reached first (curve 94A). In this example, the patient is larger than expected so the time unit 1 is reached first (curve 94A). As shown in FIG. 3A, the computer 77 then adjusts the voltage at the X-ray tube up to 110 kV in order to achieve the desired total exposure at time unit 5 (curve 94A). Graph 3B shows the film density achieved per unit of exposure time for the X-ray voltages used in FIG. 3A. Up to time unit 1, the slope rises too slowly, and is adjusted upwardly at time unit 1 to a higher slope in order to achieve the desired total exposure rate at time unit 5. In contrast, if no change was made, the total exposure rate would be optimum at time unit 10 as shown in FIG. 3C (curve 94B). Alternatively, for a smaller patient the optimum exposure rate would be achieved around time unit 1 (curve 93B). By thus modifying the exposure rate at one or more times during the exposure, an optimum image can be obtained with minimal exposure of the patient.

3a. Automatic Feedback Control With X-ray Exposure Sensor

FIGS. 16–21 set forth in greater detail the operation of an automatic feedback control system for limiting the patient's exposure while insuring a fully exposed film image.

The specific embodiment described herein is suitable for use in a radiographic examination. The system automatically adjusts one or both of the amplitude and duration of the X-ray tube voltage during an initial portion of the same exposure in order to obtain a fully exposed (100% density) film with limited radiation to the patient. The sensor 43 and integrator 42 of FIG. 1 form an ion-chamber dose feedback system which integrates over time the X-ray dosage passing through the patient. The regulated power supply provides a high-voltage output signal with a very fast rise time, i.e., 0 kV to 150 kV in 200 microseconds ($\mu$s). These features, in combination with the feedback control calculations described below, enable the output voltage to be adjusted from 40 kV to 150 kV in a maximum of 10% of a nominal 100 millisecond exposure time.

Figure 16:
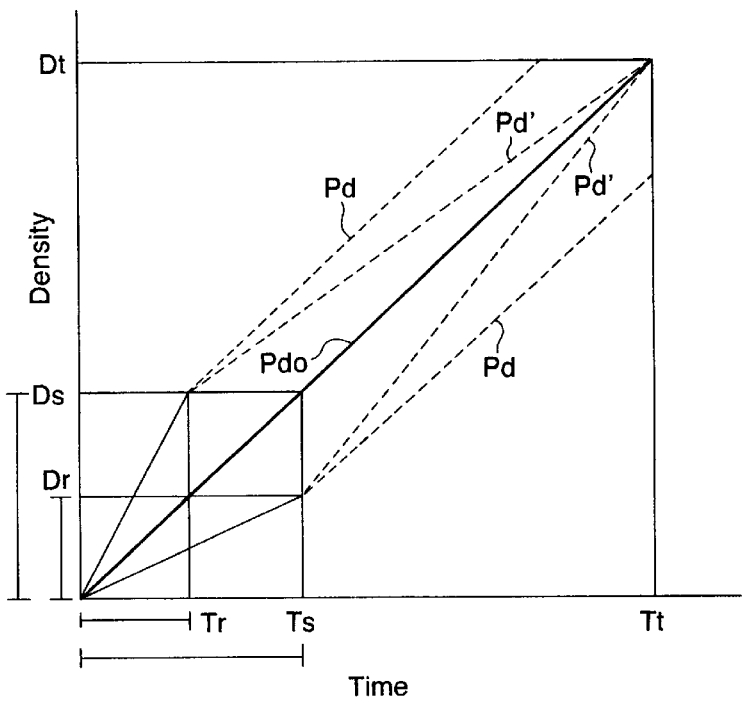
FIG. 16 is a graph of film density versus time, showing how the automatic adjustment of the density slope during an initial portion of the exposure insures 100% film density with minimum patient exposure.
Figure 17:
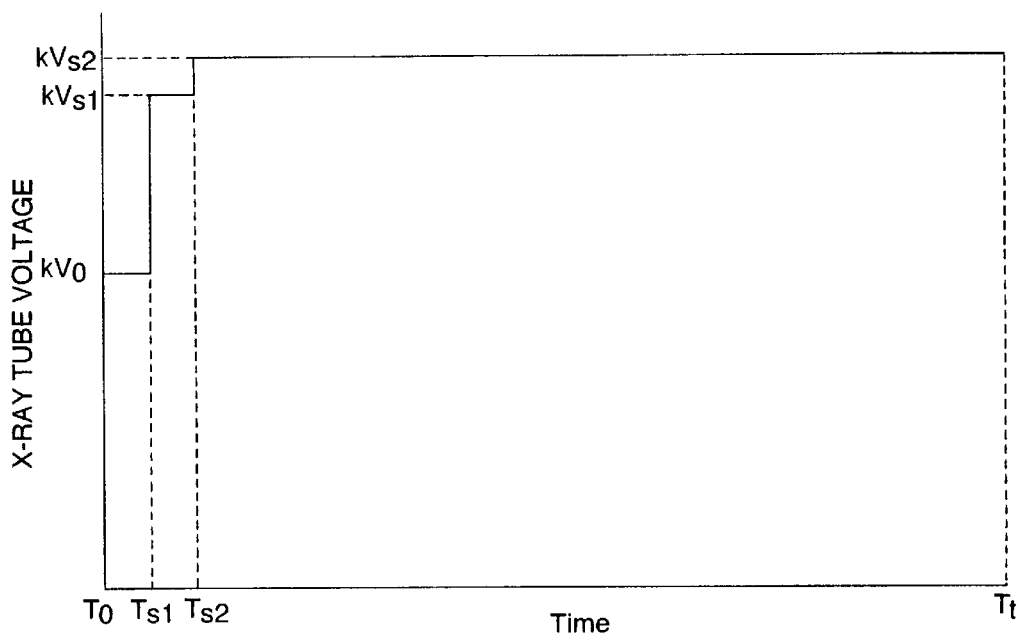
FIG. 17 is a graph of X-ray tube voltage versus time, showing how the tube voltage is automatically adjusted during the initial exposure period at sampling times $T_{s1}$ and $T_{s2}$.
Figure 18:
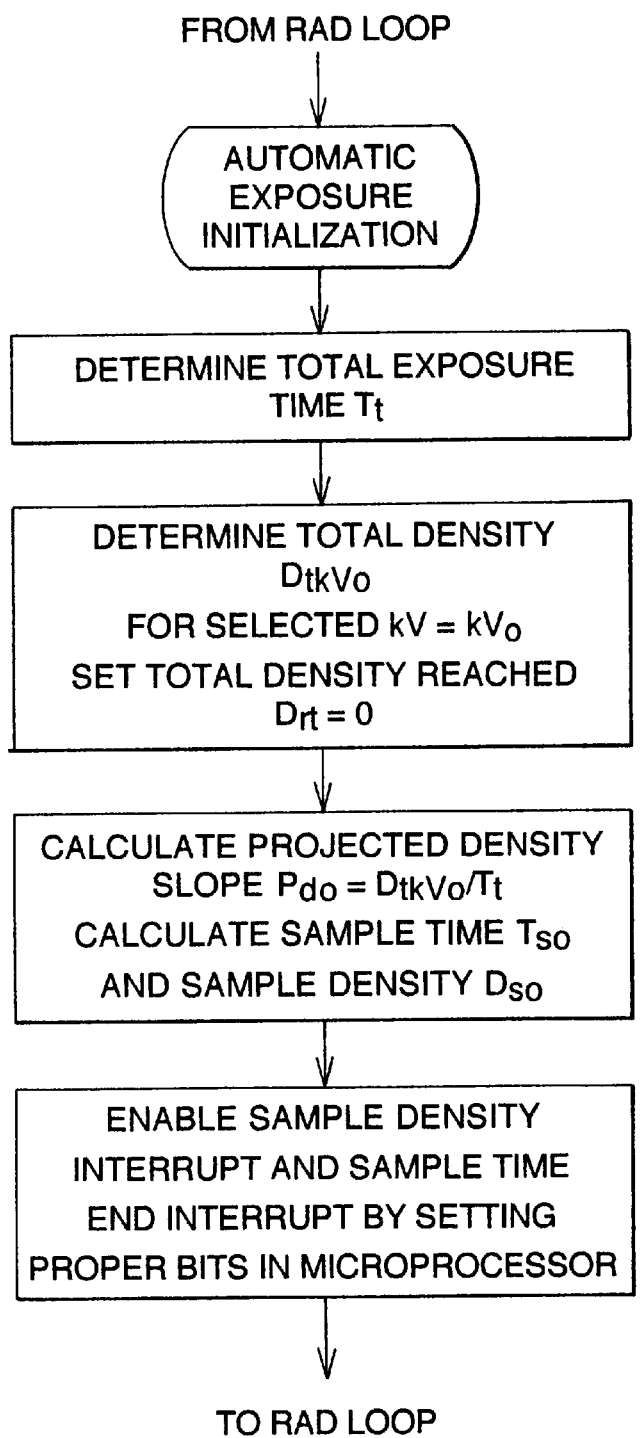
FIGS. 18–21 are functional block diagrams of a program for implementing the automatic control of the X-ray tube voltage in accordance with this invention.
Figure 19:
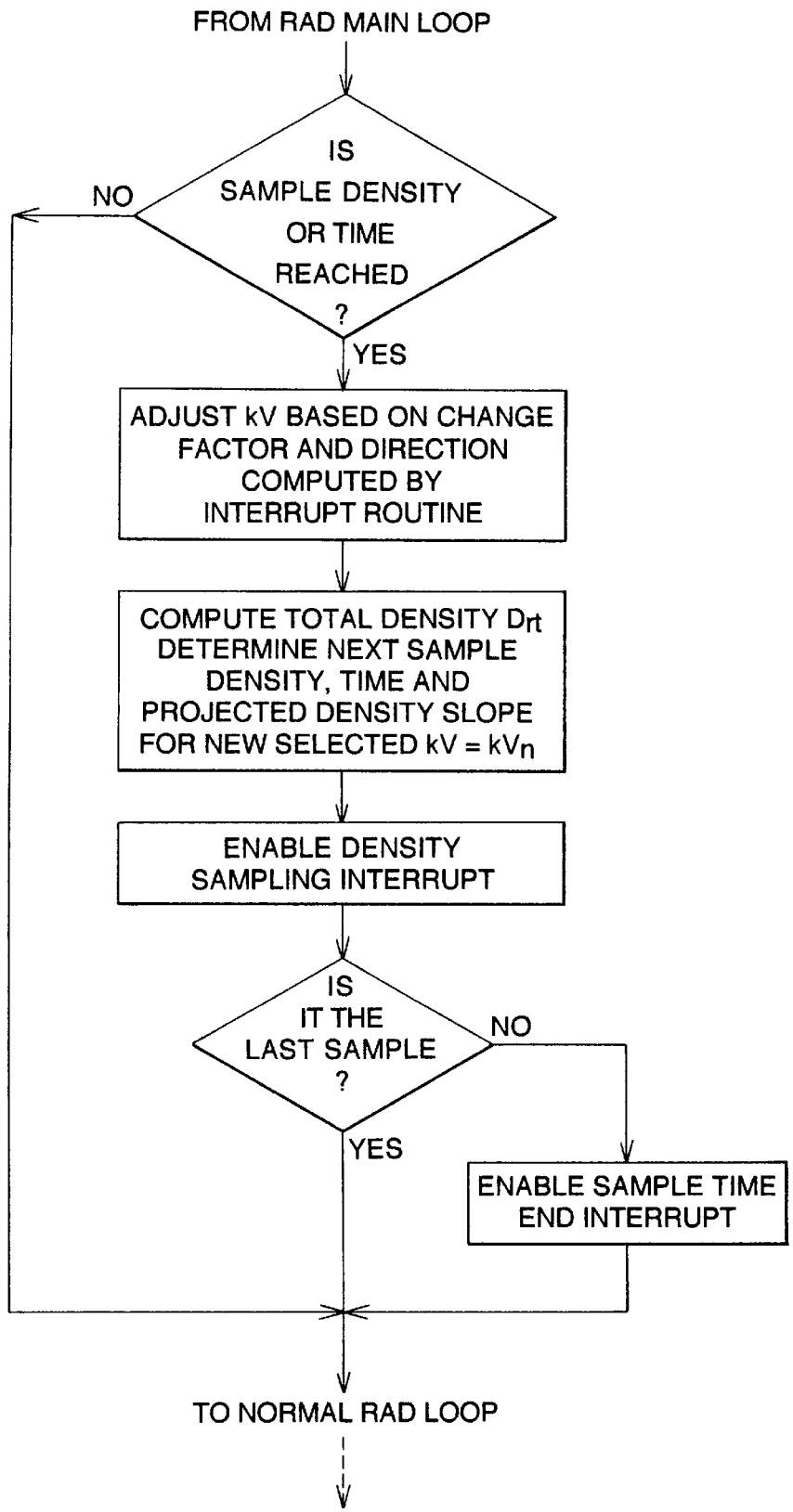
Figure 20:
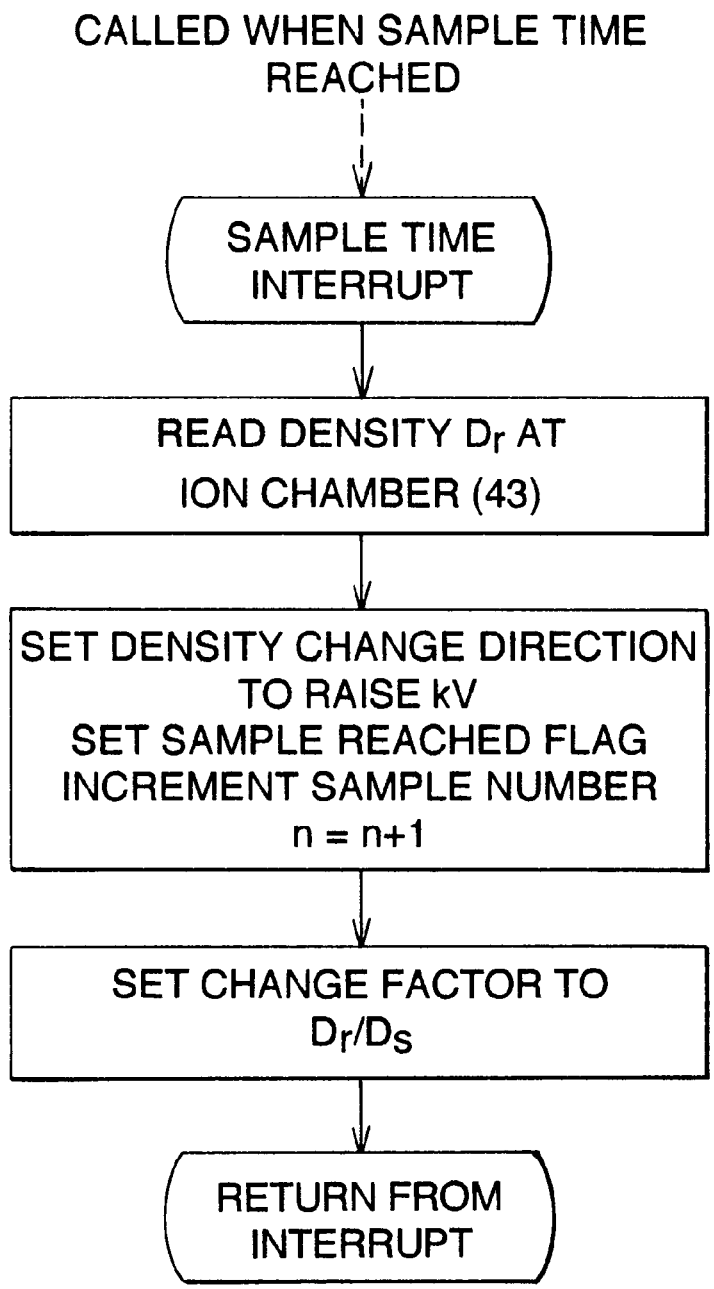
Figure 21:
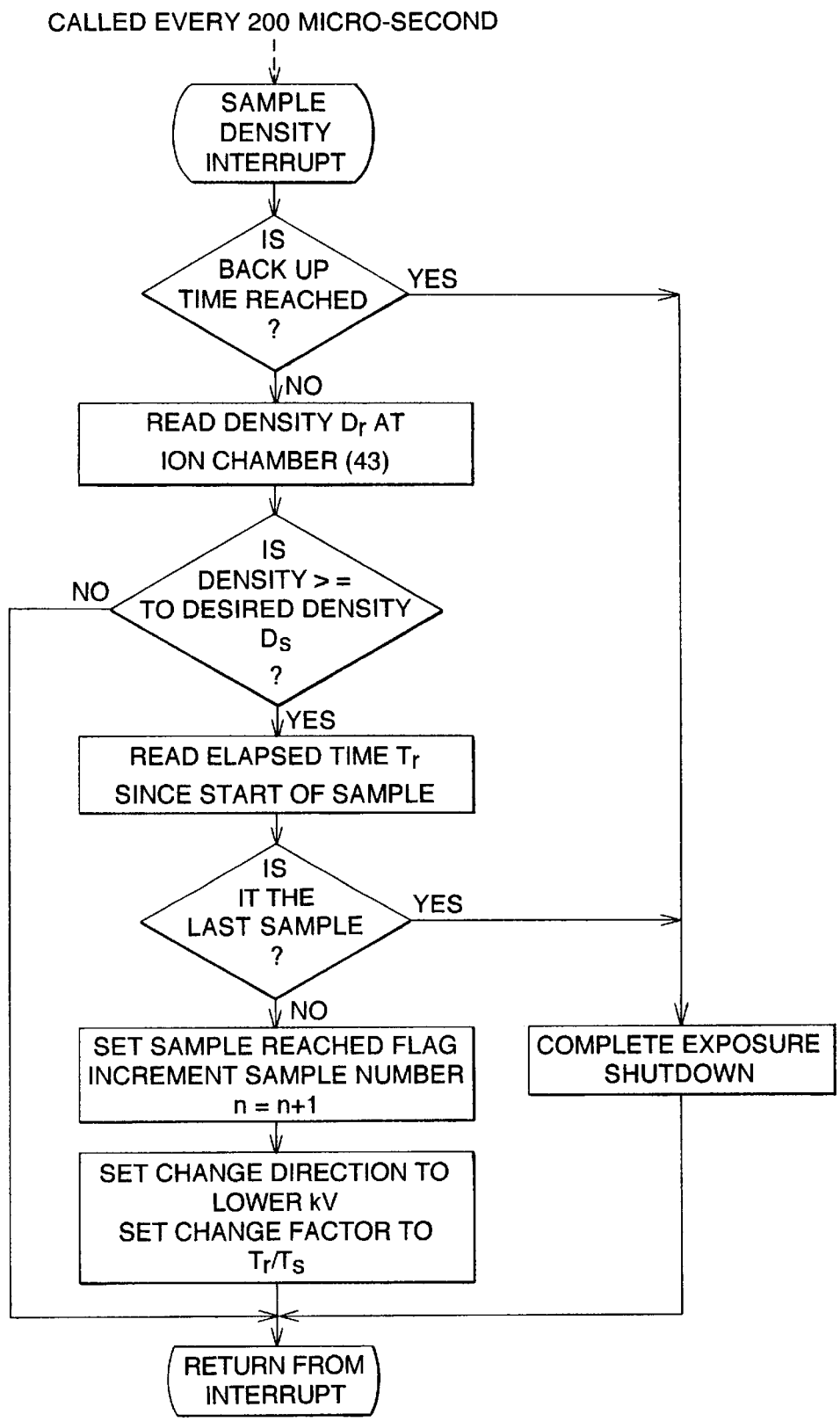

A graph of film density (or intensity) vs. time is set forth in FIG. 16. FIG. 16 illustrates how at sample density $D_s$ or sample time $T_s$, whichever is reached first, the initial kV is modified as necessary to optimize the exposure. In the example described below, the kV is modified twice during the initial portion of the exposure period. FIG. 17 shows the corresponding X-ray tube voltage vs. time, wherein two stepped increases in kV are made at sample times $T_{s1}$ and $T_{s2}$. The following calculations are made to adjust the kV at the various sample times. This system can be implemented in software in accordance with the functional block diagrams of FIGS. 18–21.

The automatic exposure control is initialized (see FIG. 18) by the operator entering an initial X-ray tube voltage $kV_o$ and a nominal exposure time $T_t$ (in this case 100 ms, with a window of 80 ms to 150 ms). The initial $kV_o$ is set at a value just below an estimated kV based on the patient's specific body size. A projected density slope $P_{do}$ is calculated from Equation 1:

$$p_{do} = D_{tkVo}/T_t \tag{1}$$

where the projected density $D_{tkVo}$ is determined based on interpolation from a table of previous user-entered density measurements for each $kV_o$.

Next, the sample density $D_{so}$ and sample time $T_{so}$ are calculated as a percentage of the total density $D_t$ and total time $T_t$. In this example, 10% is selected. The density reached is set at zero.

The exposure is started and the time and density are monitored to see which is reached first, the sample density $D_{sn}$ or sample time $T_{sn}$, where n=1 for the first sample.

If the sample density $D_{s1}$ is reached first at time $T_{r1}$, the X-ray tube voltage $kV_o$ is too high and must be lowered to a new $kV_n$ in accordance with Equation 2:

$$kV_n = kV_{n-1} * 6\sqrt{T_{rn}/T_{sn}} \qquad (2)$$

where n=1 for the first sample, $T_{rn}$ is the time reached, $T_{sn}$ is a fixed percentage of the total time, and $kV_{n-1}$ is the last sample kV.

In contrast, if the sample time $T_{s1}$ is reached first, the initial X-ray tube voltage $kV_o$ is too low and must be raised to a new $kV_n$ in accordance with Equation 3:

$$kV_n = kV_{n-1} * 6\sqrt{D_{sn}/D_{rn}} \qquad (3)$$

where n=1 for the first sample, $D_{rn}$ is the density reached, $D_{sn}$ is a fixed percentage of the total density, and $kV_{n-1}$ is the last sample kV.

Equations (2) and (3) above assume a floating point approach. Depending on the processing power of the microprocessor used, it may not be possible to work in floating point. Instead, a fixed point scaled integer representation can be used in accordance with the "change factors" in FIGS. 20–21. Note that the "change factors" ($D_r/D_s$ or $T_r/T_s$) are always fractional since $T_r$ and $D_r$ are always smaller than $T_s$ and $D_s$. A flag is used to indicate the direction of change (RAISE or LOWER). This procedure enables one to use precalculated tables of sixth root for all numbers between 0 and 1 that are acceptable in size.

The sample time for the next sample $T_{s2}$ is calculated as a fixed percentage of the total remaining time, i.e., the total exposure time $T_t$ less the actual time of the last sample $T_{s1}$. In the same manner, the sample density for the next sample $D_{s2}$ is calculated as a fixed percentage of the total remaining density, less the density reached in the last sample $D_{s1}$.

The sample time is calculated by a time based interrupt program in the feedback control microprocessor 77. The actual density reached $D_{rt}$ is a summation of all of the sample fractional densities and is calculated according to Equation 4:

$$D_{rt}=D_{rt}+(D_{rn}/D_{tkVn}) \qquad (4)$$

where $D_{rt}$ is the total density reached, $D_{rn}$ is the density reached for sample n exposed at $kV_n$, and $D_{tkVn}$ is 100% density at kV for sample n. The latter is calculated from a user input response curve.

The new $kV_n$ would obtain the desired exposure if the total exposure time $T_t$ was remaining. However, the time left in the exposure is smaller than the total exposure time $T_t$. In other words, the projected density slope $P_d$ has changed. It is therefore necessary to calculate a new projected density slope $P'_d$ in accordance with Equation 5:

$$P'_{dn} = [D_{tkVn} - D_{rt}] \div \left[T_t - \sum_{1}^{n}(T_{rn})\right] \qquad (5)$$

It is also necessary to make a second correction to the tube voltage in order to actually reach the 100% density point in the time left for the exposure. A new $kV'_n$ is calculated in accordance with Equation 6:

$$kV'_n = kV_n * 6\sqrt{P'_{dn}/P_{dn}} \qquad (6)$$

where $P_{dn}$ is the projected density calculated for the last sample.

The X-ray tube voltage is then adjusted to $kV'_n$, which becomes $kV_{n-1}$ for the next sample (n=2). The process is repeated for each successive sample until a specified number of samples is reached, in our case, two samples.

The number of iterations necessary is determined by the desired precision. In this embodiment, utilizing a power supply having a very fast rise time it was found that two samples were sufficient. When the last sample is reached, which should preferably be in a period smaller than 10% of the total exposure time $T_t$, only the density is monitored thereafter and the exposure is automatically ended within a window around the nominal exposure time (i.e., 80 to 150 ms) when the ion chamber feedback indicates 100% density. As a safety measure to limit patient exposure, the exposure is ended at 150 ms whether or not 100% film density has been reached.

By incorporating a faster processor in the feedback control circuit, it is possible to reduce the response time by a factor equivalent to the growth of processing power. Another method of enhancing the response time is to utilize an ion chamber which does not integrate the dose signal, but rather produces an output representative of the actual dose. The previously described integrating ion chamber needs time to elapse (to integrate the dosage) before responding. In contrast, an ion chamber capable of outputting the actual dose could be used by precalculating the necessary dose to obtain a desired density in a specified time. Then, by sampling the feedback during the rise time of the output kV, it would be possible to adjust for the precalculated dose. One could thus adjust the output voltage much faster.

4. DC Supply and First Control Loop

The DC power supply 90 of this invention is adapted to operate from a variety of input AC line characteristics and provide a precisely controlled high-voltage output signal.

In accordance with this invention, the separate single-phase components of the input AC line voltage are separately controlled before being applied to the primary windings of a step-up transformer. The high-voltage output of the transformer is monitored and a low-voltage control signal is derived therefrom which is representative of the high-voltage output. The low-voltage control signal is digitally processed for generating a phase drive signal. The phase drive signal is used to control the outputs of separate solid-state switching devices, such as silicon controlled rectifiers, through which each of the single-phase input signals pass before being sent to the transformer. The digital processor is able to learn the characteristics of the input AC line voltage to generate an appropriate phase drive signal for the desired output voltage. The digital processor also measures the AC line impedance. The response time of the control loop is made a function of the X-ray tube current in order to accommodate variations in the speed of voltage changes with varying tube current.

A resistor divider is used to measure the high-voltage output of the power supply. Because of the high voltage being measured, the divider is shielded to enable accurate measurement over a wide frequency range. The shield consists of grounded conductive segments disposed along the length of the resistor, which segments are coupled to a capacitor series having a lower dynamic impedance than the resistor. Stray capacitance couples to the shield and pick-up to the resistor divider is only from adjacent shield portions which are at nearly the same potential. The divider thus behaves like a true 10,000 to 1 voltage divider at frequencies from DC up to about 50,000 Hz.

Figure 4:
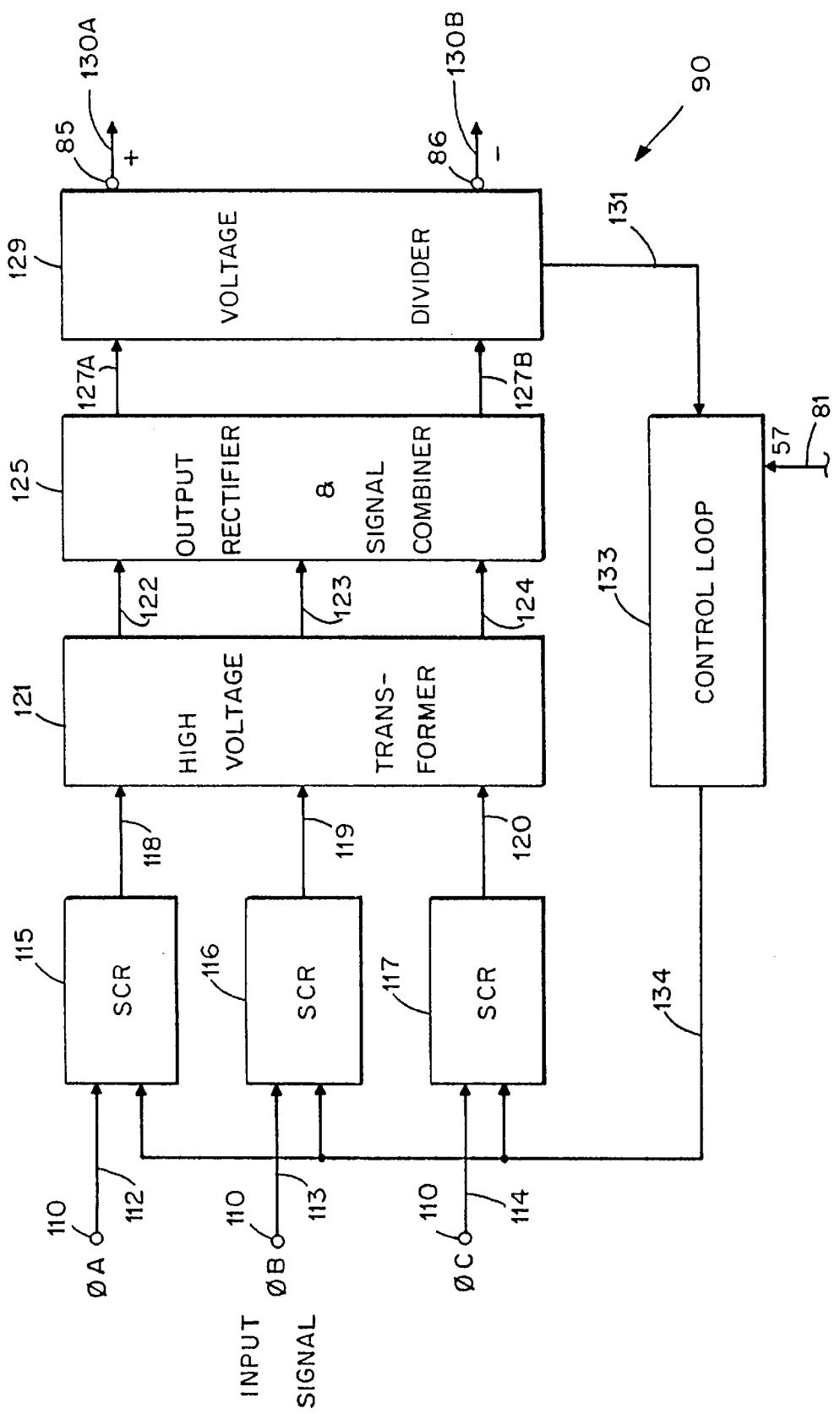
FIG. 4 is a block diagram of the DC supply circuit.

The DC supply circuit 90, as illustrated in the block diagram of FIG. 4, has an input signal applied at terminals 110 that can be a single or multiple-phase signal of unknown voltage. For the sake of simplicity, only signal lines are illustrated in FIG. 4; no grounds or shields are shown. It is understood that all phases of the input signal are referenced to the same ground.

In essence, each of input phase signals φA, φB, φC is sent on a separate line 112, 113, 114 to a separate silicon controlled rectifier (SCR) 115, 116, 117, respectively. The outputs of the SCRs are sent on separate lines 118, 119, 120 to a low-voltage to high-voltage (or step-up) transformer 121 and from there on lines 122, 123, 124 to an output rectifier and signal combiner 125. The high-voltage output signal on lines 127A and 127B is applied to a voltage divider 129 which generates a control signal on line 131 proportional to the output voltage of rectifier 125 and that is processed by first control loop 133 and used to generate a phase drive signal sent on line 134 to each of the SCRs 115, 116, 117 for controlling which portions of the input phase signals φA, φB, φC are sent to the transformer 121. By thus controlling the input to the transformer, the power supply of this invention can be used in hospitals and clinics having widely-ranging AC line characteristics, for example from single-phase 220 volts AC, to three-phase 600 volts AC. The high-voltage output of the power supply, sent on lines 130A and 130B to regulator 91, can be precisely controlled from about 30 kV to about 200 kV. Alternatively, the power supply output on lines 130 can be sent directly to the anode and cathode of an X-ray tube.

Figure 5:
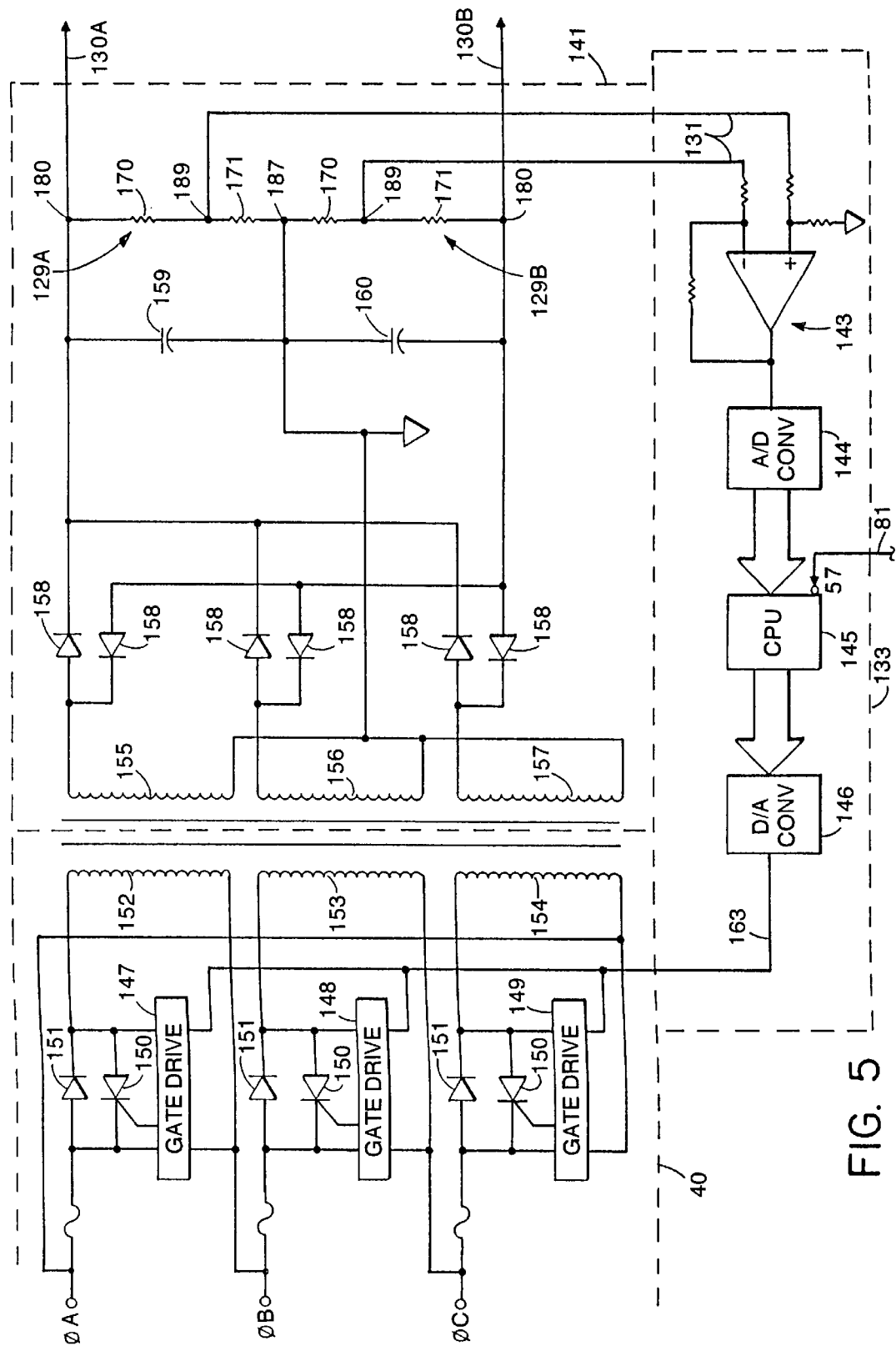
FIG. 5 is a more detailed diagram of the DC supply circuit.

FIG. 5 describes in greater detail an embodiment of the DC supply. The circuit includes three basic parts: a transformer primary circuit 140, a transformer secondary circuit 141, and a control loop 133. A high-voltage output signal sent on lines 130A and 130B is monitored by means of a voltage divider 129. A low-voltage control signal produced by the voltage divider and proportional to the voltage on lines 130 is sent on lines 131 in serial order to a difference amplifier 143 which amplifies the control signal, an analog-to-digital (A/D) converter 144 which converts the analog control signal to a digital control signal, and a central processing unit (CPU) 145 which, when programmed with the input kV required for the desired X-ray exposure (received at terminal 57 on line 81 from computer 77), furnishes a predetermined digital phase drive signal. The digital phase drive signal output by the CPU is sent to a digital-to-analog (D/A) converter 146 which converts it to an analog phase drive signal that is sent to gate drive circuits 147, 148, 149. Each gate drive circuit controls two silicon controlled rectifiers 150, 151 which supply input voltage to one of three primary windings 152, 153, 154 of the high-voltage transformer. The stepped-up voltage signals on the three secondary windings 155, 156, 157 of the transformer are rectified by a three-phase full-wave bridge comprising output rectifiers 158, filtered by two high-voltage capacitors 159, 160, and sent to voltage divider 129. The CPU, by continuously monitoring the voltage across lines 130A and 130B, controls the gate drive circuits to obtain optimum kV for the exposure.

Figure 6A:
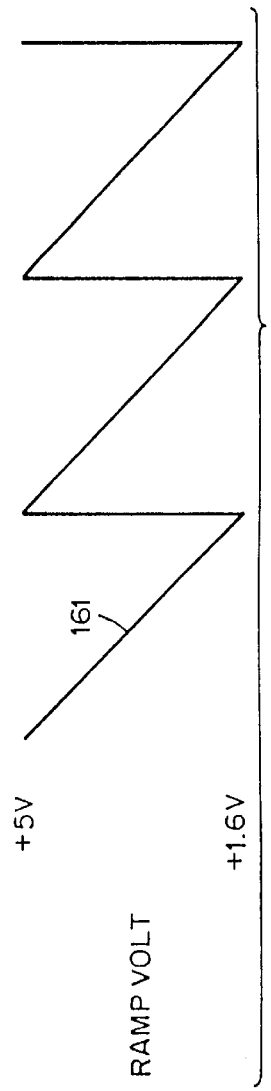
FIGS. 6A–6B are waveforms associated with the input phase control to the DC supply circuit.
Figure 6B:
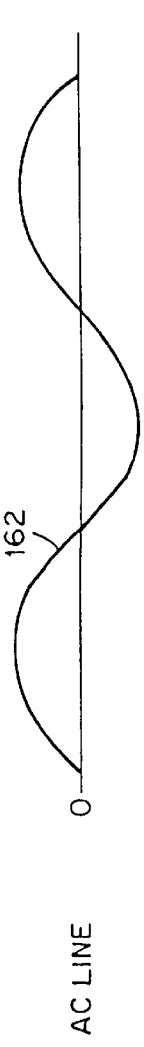
Figure 7:
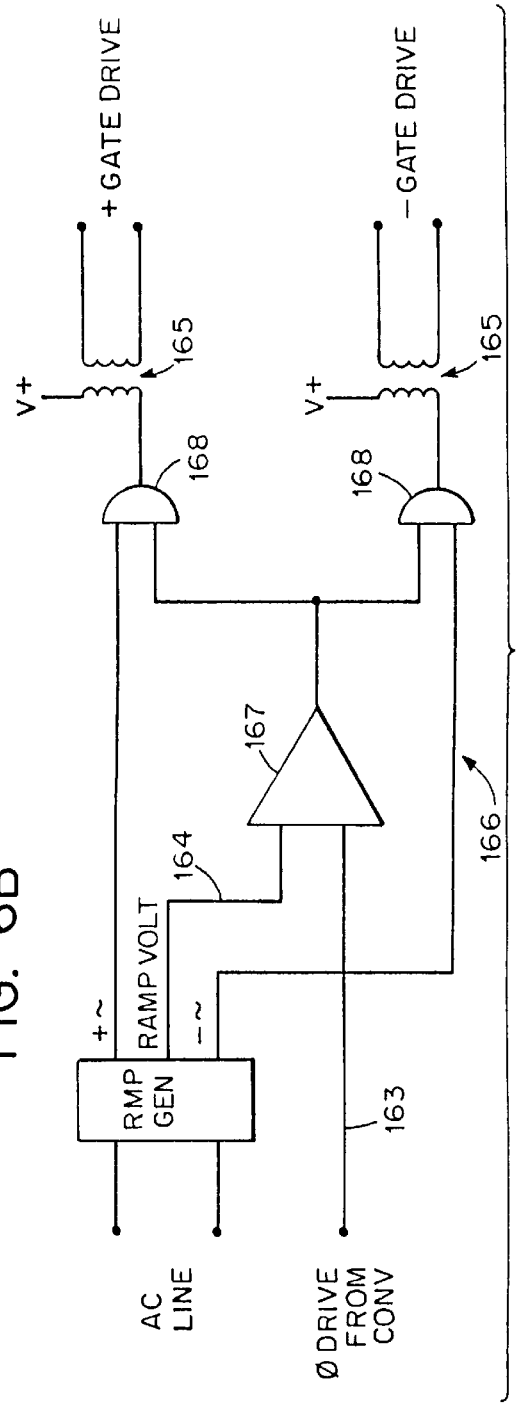
FIG. 7 is a more detailed diagram of the solid-state switching devices for accomplishing the input phase control.

As shown in FIGS. 6A–6B, each gate drive circuit includes a ramp generator which produces a ramp signal 161 that starts at +5 volts at the zero crossing of the AC single-phase sine wave 162 and ramps down to +1.6 volts at the half cycle. The phase drive signal on line 163 is compared with the ramp signal 161 on line 164 by comparator circuit 166 (FIG. 7), and each time the ramp signal goes below the phase drive signal the corresponding SCR receives a gate pulse through the pulse transformer 165. Comparator circuit 166 includes OR gate 167 followed by AND gates 168. Thus, a phase drive signal of 5.0 volts produces full conduction of the SCRs, a phase drive of 3.3 volts gives 90° of conduction, and a phase drive below 1.6 volts turns all SCRs off. Thus, by the use of phase control on the primary windings of the transformer, wide variations of the AC input line voltage can be accommodated to achieve a precisely controlled output voltage.

The secondary circuit 141 has one end of each transformer secondary winding 155, 156, 157 tied to ground. This enables the transformer primary to be wound directly on the transformer core (600 volts insulation) and then the secondary can be wound with no high-voltage insulation between the primary and the ground side of the secondary. This reduces the size of the core and of the transformer. The remainder of the secondary circuit consists of a six-phase, additive, full-wave bridge with each rectifier 158 shown consisting of 25 controlled avalanche rectifiers in series, followed by two capacitors 159, 160, and two 10,000 to 1 voltage dividers 129A and 129B. Each divider consists of three 20 meg ohm resistors 170 in series with a 6.04K ohm resistor 171 tied to zero volts DC. The large energy storing capacitors 159, 160, coupled with the input phase control, produce a stable output voltage with minimum ripple. The input AC line ripple, at two to six times the line frequency, is substantially eliminated.

The control loop 133 consists of converter circuits which provide the CPU 145 with feedback information on the input kV and allow the CPU to control the phase drive to the primary circuit. The control loop must function under the following difficult conditions: open loop gain which is highly non-linear; loop response which varies with line voltage and impedance; and loop response time which varies with X-ray tube current. Thus, during a preparation delay before an X-ray exposure, the software in the CPU monitors the relationship between the phase drive signal and the resulting high-voltage output signal to compensate for changes in the AC line. Variations in AC line impedance are measured during an exposure. After the power supply has performed about 15 X-ray exposures, the software has "learned" the line characteristics, stored them, and is able thereafter to predict the response of the loop. The closed loop control system, which includes software running on the computer, uses proportional, integral, and differential terms in order to optimize the overall performance. The integral term, which is comparable to loop response time, is made a function of the X-ray tube current because the voltage change varies with tube current. At a very high tube current the tube voltage can fall as much as 40 kV in 10 ms. In contrast, at very low tube currents, the 0.5 $\mu$F capacitors take ten seconds to drop 40 kV.

In order to obtain maximum performance from the closed loop control system, very accurate feedback information is required. This is difficult because the resistor divider is measuring potentials as high as 100 kV, which requires very high resistor values. Furthermore, relative potentials can change in the high-voltage tube circuit at rates as high as 1000 volts/microsecond and stray capacitive coupling to the voltage divider resistors makes accurate transient response of the closed loop difficult. A straight-forward resistor/capacitor divider would require one percent high-voltage capacitors which do not change with applied voltage, and such parts are not generally available.

The present invention thus uses a shielded resistor divider which prevents stray capacitance from adversely affecting the feedback information provided to the control loop. The circuit utilizes a series of nearly complete shields around the resistor divider with each shield tied dynamically to about the same potential as that part of the divider it is shielding. Stray capacitance is thus coupled to the shield and consequently, signal pick-up to the divider comes only from the adjacent shield at nearly the same potential. The divider thus behaves like a true 10,000 to 1 voltage divider at frequencies from DC up to about 50,000 Hz.

Figure 8:
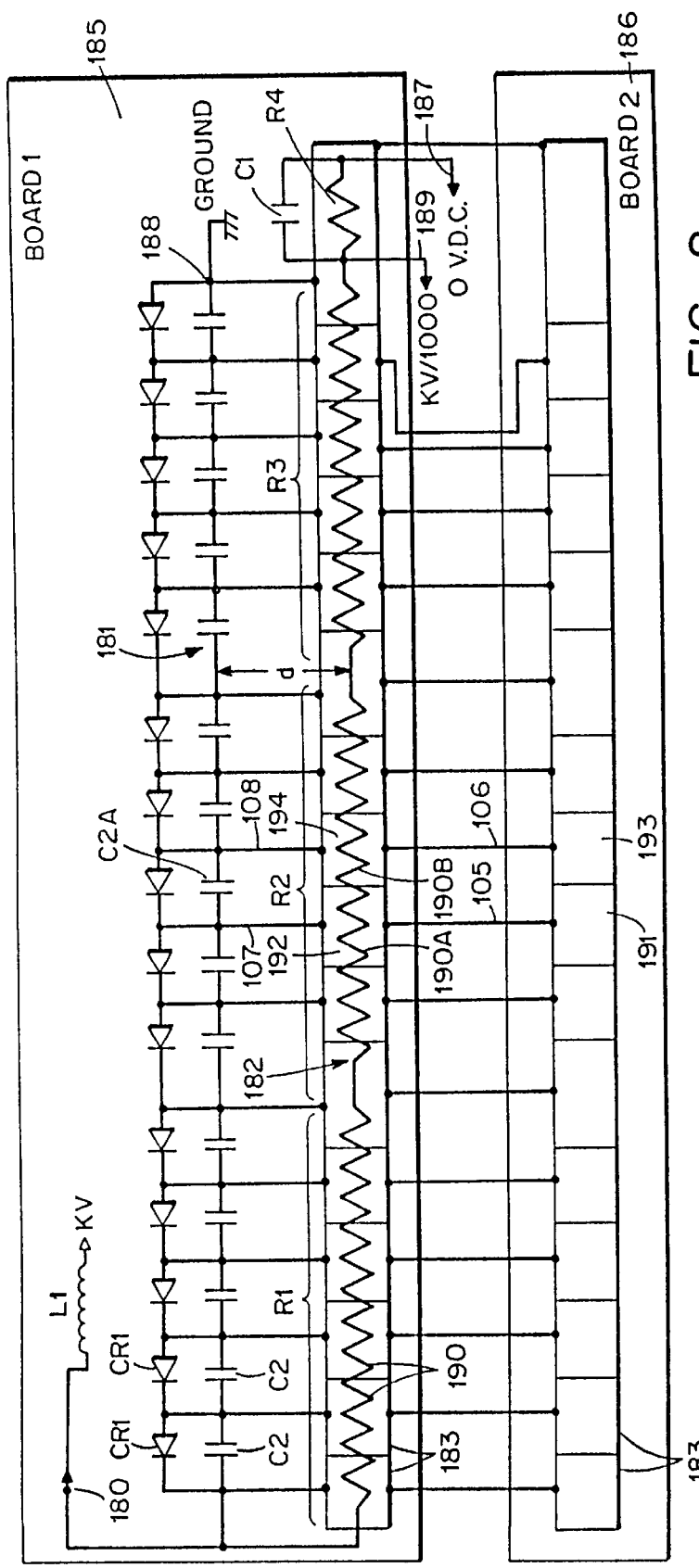
FIG. 8 is a schematic diagram of a shielded resistor divider circuit for measuring voltage in accordance with the present invention, showing top plan views of first and second boards.

As shown in FIG. 8, the divider itself consists of three high ohmic value resistors R1, R2, R3 in series with a low ohmic value resistor R4 tied to zero volts DC, forming resistor series 182. A capacitor C1 in parallel with resistor R4 provides a pole for infinite frequency gain at about 160 kHz, to eliminate high-frequency pick-up. The shield includes fifteen capacitors C2 in series, forming capacitor series 181. Fifteen diodes CR1 are provided in parallel with these capacitors to clamp the output voltage at terminal 180 to prevent the output voltage from reversing polarity during an X-ray tube arc. Conductive metallic shield segments 183 above and below the resistor divider 182 are coupled to the capacitor series 181 for dissipating stray capacitance.

Figure 9:
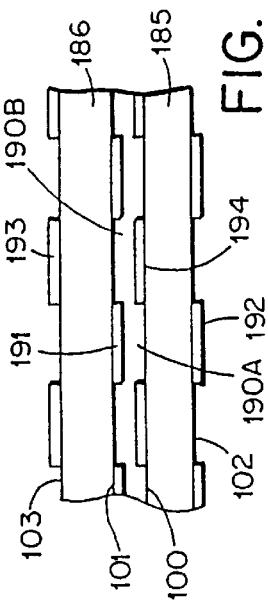
FIG. 9 is a schematic cross-sectional view of a portion of the shielded resistor divider of FIG. 8, showing the second board disposed above the first board.

FIG. 8 shows a top view of a first board 185 containing the resistor series 182, capacitor series 181 and conductive segments 183, and a top view of a second board 186, showing additional conductive segments 183. Boards 185 and 186 are stacked as shown in FIG. 9, with board 186 above board 185. The four resistors R1, R2, R3, R4 are set forth in a straight line along the length of the board. A terminal 180 at one end of the series is connected to either the positive or negative lines 130A or 130B (as shown in FIG. 5) and an opposing terminal 187 to zero volts DC. Terminal 189 between R3 and R4 provides the low-voltage control signal on line 131. The capacitor series 181 is set forth in a straight line parallel to and spaced apart a predetermined distance "d" from the resistor series 182 along the length of the board. One end of the capacitor series is also tied to terminal 180 and the other end is tied to ground at terminal 188. A series of 15 diodes CR1, each one in parallel with one of the capacitors C2, are disposed along the length of the board adjacent to the capacitor series with opposing ends tied to the same end terminals as the capacitor series.

The resistor series 182 is divided into 15 portions 190 by two series of paired conductive segments which are disposed alternatively on opposing sides of the boards 185 and 186. As shown in FIG. 9, a first series of paired segments includes a first member 191 on the inner face of board 186 and a second member 192 on the outer face of board 185. A second series includes a third member 193 on the outer face of board 186 and a fourth member 194 on the inner face of board 185. By inner faces it is meant the surfaces 100, 101 of boards 185 and 186 adjacent one another, the opposing surfaces 102, 103 being the outer faces. The first and fourth members 191, 194 conductively engage the adjacent portions 190A, 190B of the resistor divider. The first and second members 191, 192 are conductively joined by a screw 105 extending through the boards. Likewise, the third and fourth members 193, 194 are joined by a screw 106 extending through the boards. A capacitor C2A is coupled between adjacent pairs of paired conductive segments 191, 192 and 193, 194 respectively by conductors 107, 108. The conductors 107, 108 are on opposing surfaces of board 185 and connect second member 192 and fourth member 194. In this manner, each shield pair (e.g., 191, 192) is tied dynamically to about the same potential as that part of the divider (e.g., 190A) it is shielding so that any stray capacitance which reaches the divider comes only from the adjacent shield pair (e.g., 193, 194) at nearly the same potential.

The predetermined distance d between the resistor series 182 and capacitor series 181, as well as the size and placement of the conductive segments 190, is determined by the values of the resistors R1, R2, R3 being used and the potentials being measured. Depending upon the frequency response and shielding characteristics desired, the physical location of the various components and the dimensions thereof are adjusted.

The voltage divider circuit additionally includes inductor L1. The combination of inductor L1 and capacitor series 181 forms a tuned circuit that limits the transient voltage rate applied to the power supply in the case of an X-ray tube arc-over. When an X-ray tube arcs over, the rise time of the high-voltage pulse may be on the order of a few nanoseconds. A voltage change with respect to time of such a high rate may damage the components in the high-voltage DC power supply. Therefore, to limit the transient voltage change with respect to time to a value that will not destroy the components in the power supply, the values of L1 and the capacitance of capacitor series 181 are selected to form a tuned circuit with a resonance frequency of approximately 100,000 Hz. The rise time of the transient voltage is thus limited to approximately 2.5 $\mu$s which is slow enough to protect components in the power supply. The tuned circuit does not absorb the transient voltage, but reduces its rise time so that it does not destroy a power supply component. The transient protection circuit including inductor L1, capacitor series 181, and diodes CR1 in effect changes the dV/dt to a rate that is slow enough to prevent damage to components in the high-voltage DC power supply.

A device identical to the shielded voltage divider 129 just described may likewise be provided at the output side of FET series 1 (identified as voltage divider 5 in FIG. 1). Where divider 5 includes the tuned circuit and diode protection (against voltage spikes and reversals of polarity), these elements protect both the regulator 91 and power supply 90 circuits and thus it is not necessary to repeat these elements in divider 129.

5. Discharge Modules

The discharge modules 210A, 210B of this invention are connected to the cables between the regulator circuit 91 and X-ray tube 70 and serve to discharge any capacitive voltage remaining on the cables between exposure frames.

Each discharge module includes a high-voltage circuit portion and a low-voltage circuit portion, electrically isolated from one another, and transmitting and receiving means for sending a trigger signal from the low-voltage portion to the high-voltage portion. The high-voltage portion is coupled to the high-voltage cable and includes a resistor series and a switch for coupling the resistor series to the high-voltage cable. The low-voltage portion receives a control signal from the computer which identifies the end of a high-voltage output pulse sent to the X-ray tube. The low-voltage portion then generates a trigger signal which is transmitted to the high-voltage portion to activate the switch and thereby couple the cable to the resistor series to discharge any remaining capacitive voltage on the cable.

A further feature of the discharge module is to provide fault detection if the X-ray tube current exceeds a predetermined maximum. Thus, the discharge module further monitors the current in the X-ray tube and if it exceeds a predetermined maximum, the exposure is terminated.

There is now described an apparatus, and more particularly embodied in a circuit 210, for discharging capacitive voltage on a cable between the regulator circuit 91 and an X-ray tube 70. Alternatively, the discharge modules could be disposed between a high voltage power supply and the X-ray tube, if no regulator circuit is provided.

Figure 11:
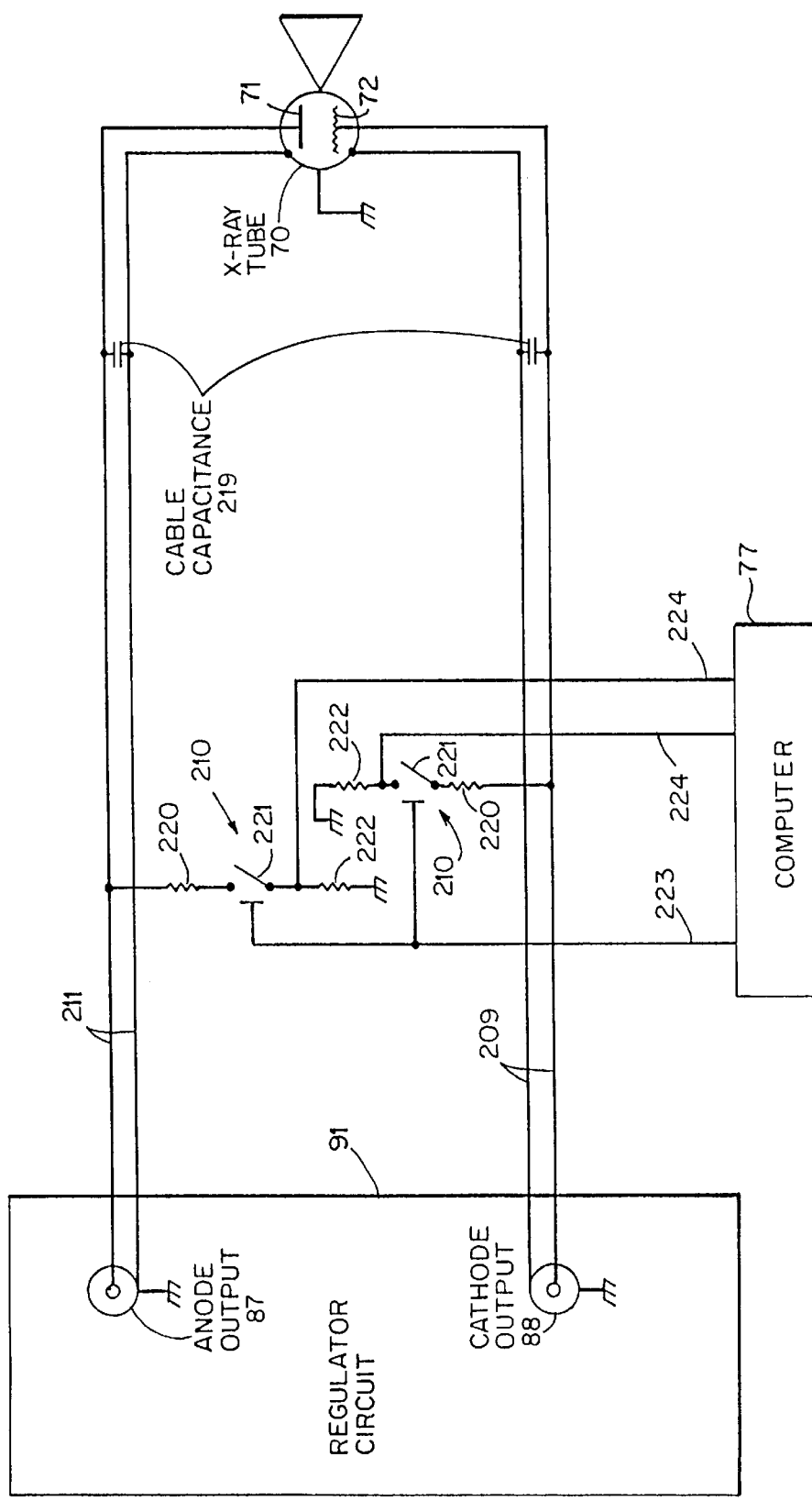
FIG. 11 shows two discharge modules of this invention disposed between the power supply and X-ray tube.

The circuit 210, as illustrated in the block diagram of FIG. 11, is connected to a high-voltage cable 211 connecting an anode output 87 of regulator circuit 91 and an anode 71 of an X-ray tube 70. An identical circuit is connected to a cable 209 connecting a cathode output 88 of the regulator and a cathode 72 of the X-ray tube. Each of the high-voltage cables 211, 209 includes two conductive leads, one of which is grounded. The cable capacitance 219 is shown schematically between the leads. Each circuit 210 includes a discharging resistor series 220, a switch 221, and a current-monitoring resistor 222 between the cable and ground. The switch 221 is activated by a discharge trigger signal sent on line 223 from computer 77. The output of the current-measuring resistor 222 is sent back to the computer on lines 224 for fault detection.

As shown in FIG. 10, the discharge module is designed to eliminate the "tail" on the output voltage waveform from the regulator 91 which consists of unwanted soft radiation which adds to patient dosage, but does not improve the X-ray image. FIG. 10A shows a pulsed output signal 205 having a tail 207 which results without the discharge module of this invention, and FIG. 10B shows a substantially rectangular output waveform 206 with the discharge module employed.

Typical high-voltage X-ray cables 211, 212 exhibit capacitance of about 50 pF per foot and are of a maximum length of about 100 feet. Fluoroscopy is typically performed at a maximum of 125 kV (potential difference between anode and cathode) and at a frame rate of 60 images per second. The power dissipated by the cable discharge module is therefore:

$$power = \tfrac{1}{2} CV^2 F$$

where C is the cable capacitance, V is the X-ray tube voltage, and F is the frame rate. In the particular embodiment described herein the power is: power=½(5 NF)(62.5 KV)² (60 frames/sec)=5 watts, for each of the anode and cathode. The discharge modules remain in place during normal radiography and therefore must be able to withstand 75 kV per side. The module therefore comprises a 600 watt resistor in series with an 80 kV switch, along with the triggering and fault detecting circuitry described hereinafter.

Figure 12:
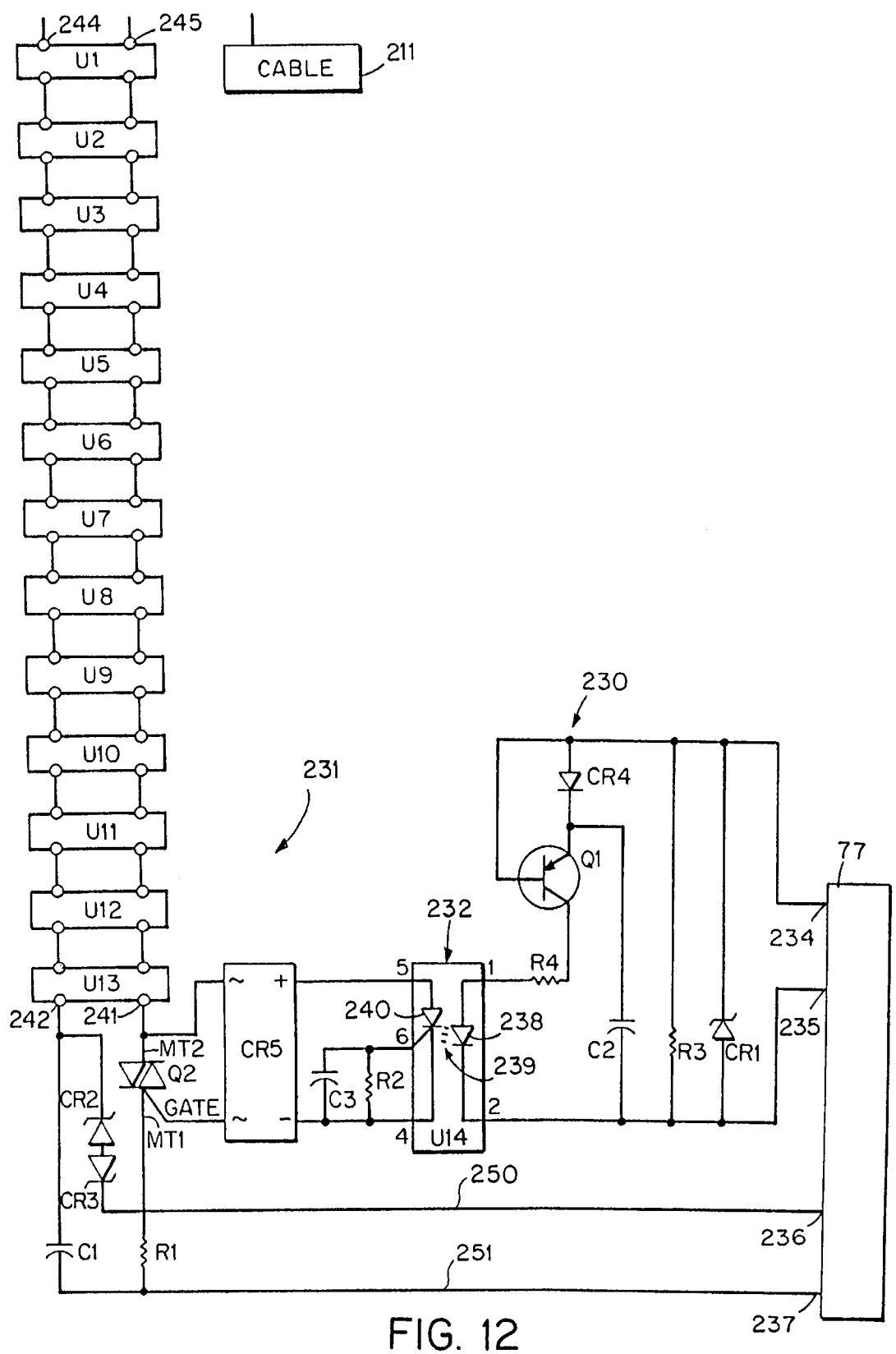
FIG. 12 is a more detailed diagram of one of the discharge modules of FIG. 11.
Figure 13:
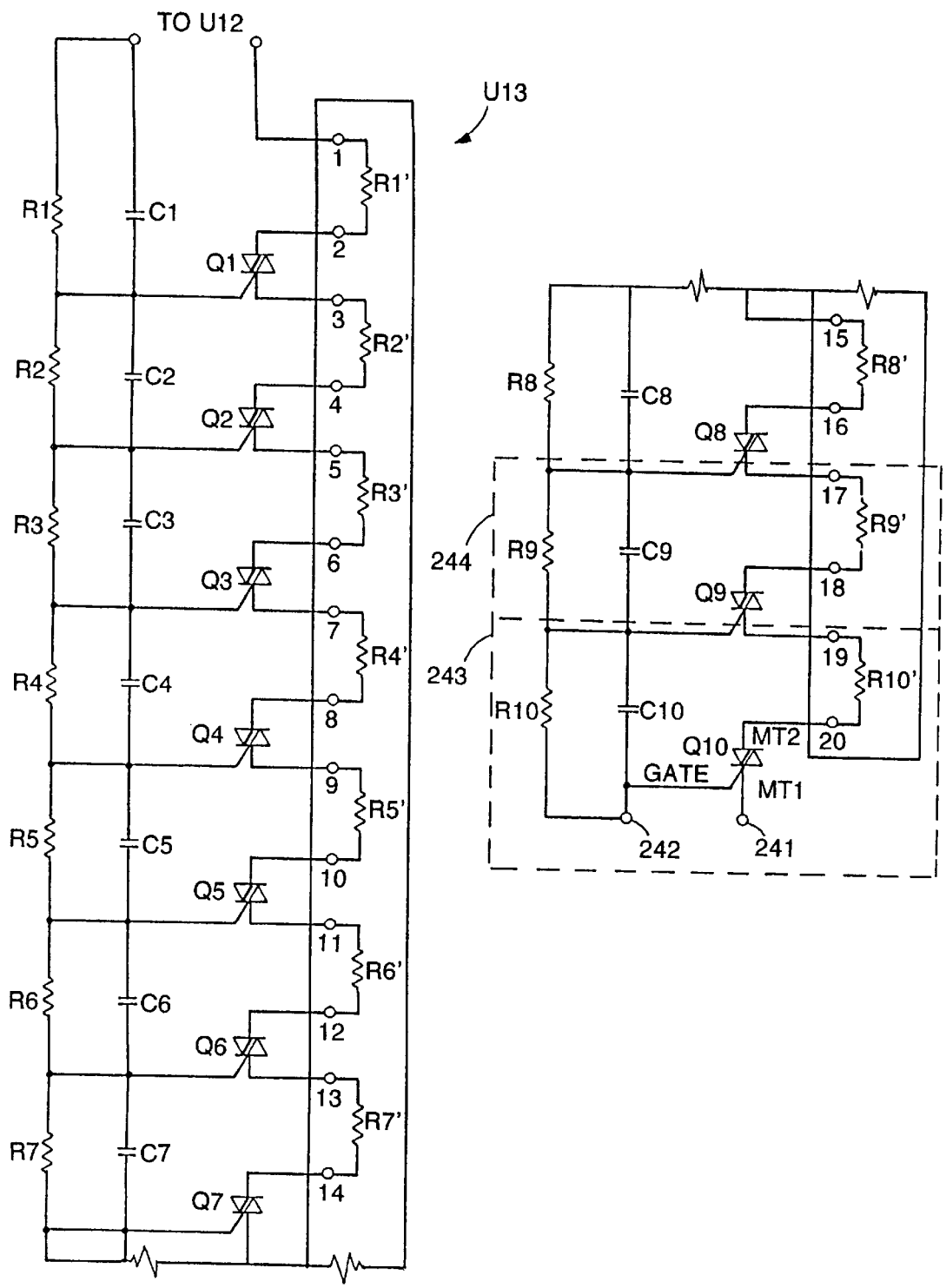
FIG. 13 is a detailed diagram of a portion of a triac/resistor series used in the circuit of FIG. 12.

The energy dissipating resistor 220 consists of 10 thick film resistors screened onto each of 13 ceramic substrates. FIG. 12 shows the 13 substrates U1–U13 connected in series and FIG. 13 shows bottom substrate U13 having 10 thick film resistors R1'–R10' connected in series. When immersed in transformer oil, the 130 resistors R' are able to dissipate the required 5 watts each.

Each of the discharging resistors R' is part of a power dissipation stage. FIG. 13 shows a bottom power dissipation stage 243 on U13, which includes dissipating resistor R10', triac switch Q10', and control resistor and capacitor R10 and C10 connected in parallel with one another and with R10'. The ten stages on U13 are connected in series, with the discharging resistors R1'–R10' and their associated switches Q1–Q10 connected in series, and the control resistors and capacitors R1–R10 and C1–C10 also connected in series. The control resistors R1 to R10 in each power dissipation stage are in place to ensure a voltage balance among the 130 triacs.

As shown in FIG. 13, each of triacs Q1–Q10 has a breakdown voltage of 800 volts. Each substrate contains 10 triacs, and thus there are 800×10=8000 volts breakdown voltage per substrate. A minimum of 10 substrates is required to provide 80 kV breakdown voltage. Three extra substrates add 8000 ×3=24 kV of breakdown voltage protection to accommodate any imbalance in the applied voltage and as a margin for error in applied voltage.

As shown in FIG. 12, the discharge module consists essentially of three parts: 1) a low-voltage control circuit 230 which receives a trigger signal from the computer; 2) a high-voltage circuit portion 231 including the resistor series, a switch Q2 for turning on the resistor series, and a resistor R1 for measuring the current in the X-ray tube; and 3) an optical transmission path 232 separating the low-voltage portion and the high-voltage portion.

The low-voltage portion 230 has an input terminal 234 connected to computer 77, and an output terminal 235 connected to DC ground. During an X-ray exposure, between 10 and 100 milliamps of current passes from terminal 234 to terminal 235 and at the end of the exposure this current goes to zero. This current charges capacitor C2 through diode CR4 to about 5.5 volts. As long as more than about 1 milliamp is passing through resistor R3 and diode CR1, the base of transistor Q1 is held above its emitter and the transistor is off. At the end of the exposure, the base of transistor Q1 drops through resistor R3 while the emitter is held up by capacitor C2 and transistor Q1 is turned on, thereby transferring the energy of capacitor C2 into the LED 238 of optical isolator U14 through resistor R4. The light 239 emitted by the LED turns on the light-activated silicon control rectifier (SCR) 240 of U14.

In the high-voltage portion 231 of the circuit, the voltage at upper terminal MT2 (main terminal 2) of transistor Q2 is positive when the discharge module is installed on the anode output, and negative when the discharge module is installed on the cathode output. In either case, however, a full-wave bridge rectifier CR5 produces a positive DC voltage at the anode of the SCR in U14 and when the SCR 240 is turned on, Q2 will receive gate current and will turn on. Prior to Q2 turning on, the entire discharging resistor series U13–U1 is at the cable voltage because terminals 244, 245 on U1 are both connected to the high-voltage cable lead and Q2 is open so no current can flow through U13–U1. When Q2 is turned on, the energy in capacitor C1 is discharged through the gate/MT1 junction of the bottom triac Q10 on U13, MT2/MT1 of Q2, and R1, thus turning on the bottom power dissipation stage 243. The voltage drop at terminal 242 causes C10 to provide a voltage signal to the adjacent triac Q9, turning on Q9 and thus adjacent triac 244. Thus, by turning on only the bottom power dissipation stage of the chain U13–U1, the entire chain comes on and the residual cable capacitance voltage is dissipated in the 130 resistors R' of U1–U13. A series circuit is thus formed including C1, the resistor chain on each of U13–U1, switch Q2 and resistor R1.

The voltage across the resistor R1 is proportional to the current in the resistor chain and is sensed by the computer 77 during an X-ray exposure. Lines 250, 251 are connected across R1 and to terminals 236, 237 of the computer. If for any reason more than about 100 milliamps is sensed during an exposure, a fault is indicated and the output voltage of FET series 1 is terminated to thereby terminate the exposure. The diodes CR2 and CR3 provide protection against high voltage transients.

6. Current Measuring Apparatus

The current measuring apparatus 320 of this invention includes a pulse generator which generates an electric pulse signal having a frequency proportional to the magnitude of the tube current. The pulse generator may be an aystable comparator which receives an input signal proportional to the tube current flowing through a capacitor/resistor network and compares it to a reference voltage, outputting a pulse signal whenever the input signal exceeds (or falls below) a voltage reference. The pulse signals are coupled to a light-emitting diode (LED) which transmits light pulses across a light path to a low-voltage portion of the measuring apparatus. The low-voltage circuit includes a photodiode for receiving the light emitted by the LED and may include additional circuit elements for reconverting the pulse signals into a measurement signal representative of the tube current. The high and low-voltage portions of the circuit are thus electrically isolated. Furthermore, the components of the high-voltage circuit are powered by the small tube current. The output of the current to frequency converter is linear over a dynamic range of tube current from 0.5 ma to 1200 ma.

The apparatus of this invention is embodied in an electrical/optical circuit for measuring the current in an X-ray tube. The circuit 320, as illustrated in the block diagram of FIG. 14, has a pair of electrical input leads 310A, 310B connected to paired cables 38A, 38B connecting the output 85 of a DC power supply 90 to the input of an X-ray tube 70. While the leads are shown connected to the high-voltage cable lines 38A, 38B supplying the anode 71, the leads could alternatively be connected to the high-voltage cable lines 39A, 39B connected to the cathode 72.

Figure 14:
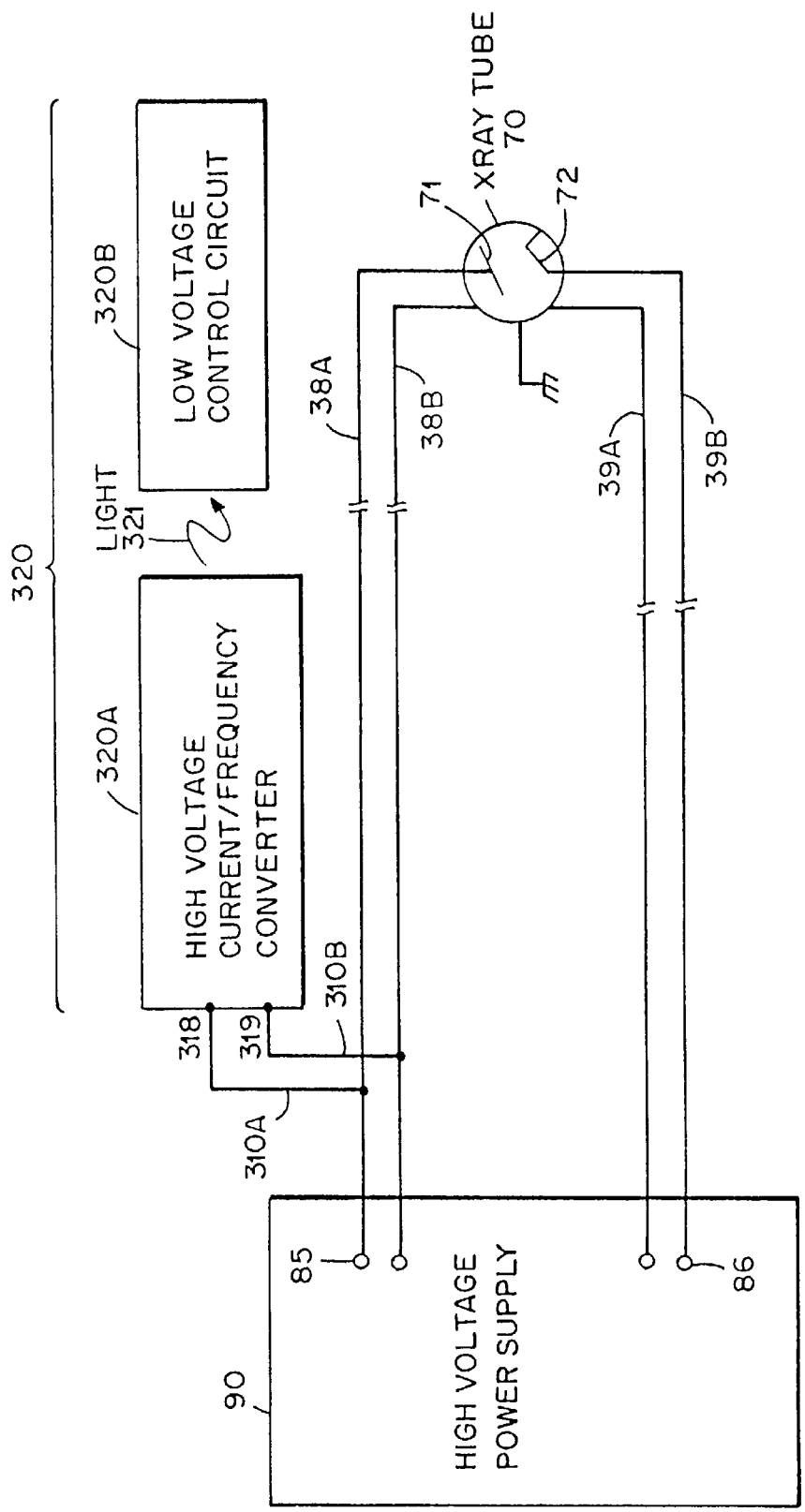
FIG. 14 is a block diagram of the current measuring apparatus of this invention connected between the power supply and X-ray tube.

As shown in FIG. 14, the input leads 310 connect a high-voltage current to frequency converter circuit 320A to the X-ray tube circuit. The current to frequency converter is able to operate at the high-voltages of the X-ray tube circuit and is powered solely by the current in the X-ray tube circuit, which may be as low as 0.5 ma. A pulsed signal representing the current measurement is produced by the current to frequency converter and sent via optical transmission across light pipe 321 to a low-voltage control circuit 320B. This enables the current measurement to be accurately transmitted across the high-voltage boundary. Furthermore, the current to frequency converter measures the true X-ray tube current without being affected by high-tension transformer leakage current and various stray capacitive currents from either the high-voltage power supply or the X-ray tube.

Figure 15B:
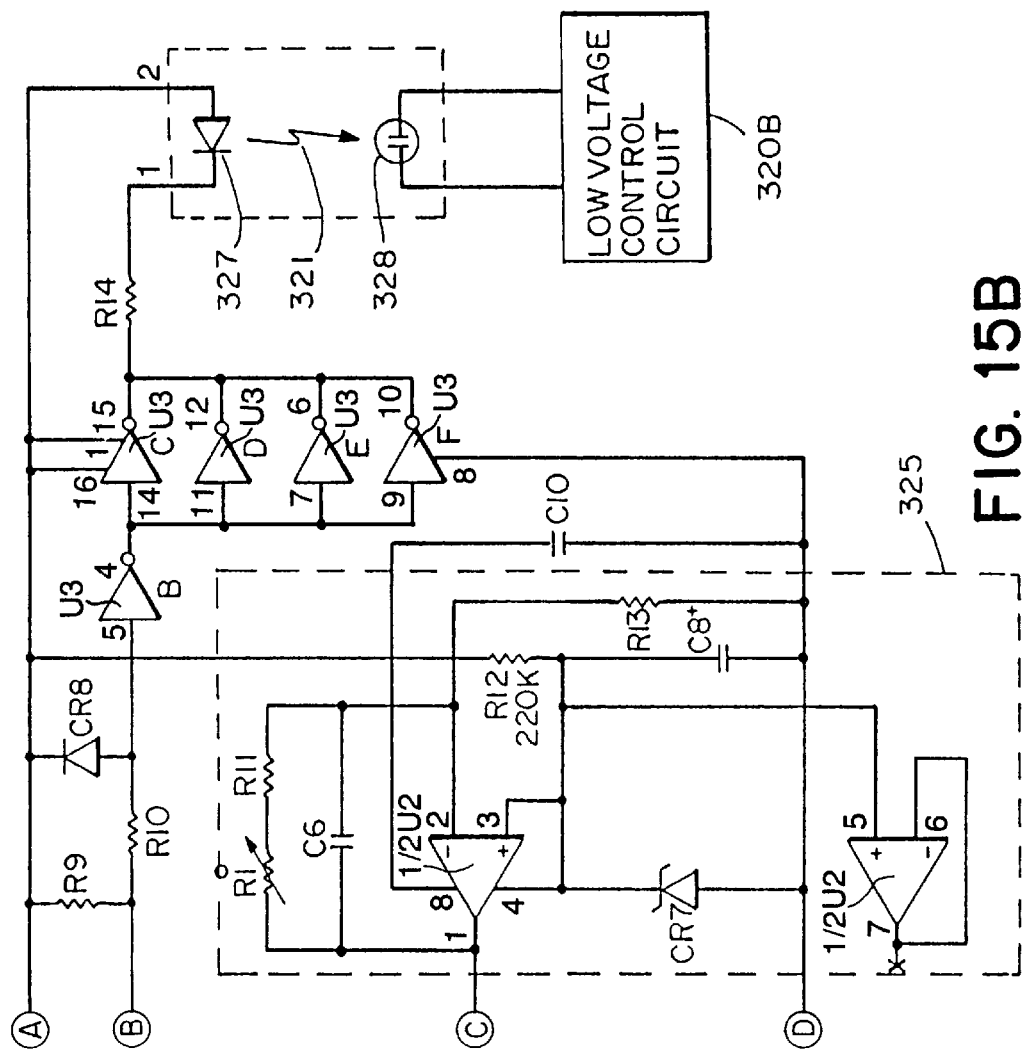
FIG. 15 is a more detailed diagram of the current measuring apparatus of FIG. 14.

FIG. 15 describes in greater detail an embodiment of the present invention. The high-voltage converter circuit 320A includes five basic parts: a regulator 323 which provides a low-voltage power supply; a capacitor/resistor circuit 324 through which the X-ray tube current flows to generate a ramp signal across terminals 319, 318; a circuit 325 for generating a voltage reference; a comparator 326 for comparing the ramp signal and voltage reference and outputting a pulse signal; and an LED 327 activated by the pulse signal.

In essence, the converter circuit functions as a self-powered current-to-frequency converter which activates a light-emitting diode. (LED) 327 with narrow pulses of current. The light 321 from the LED is coupled via a light pipe cross the high-voltage boundary to a photodiode 328 connected to a low-voltage control circuit 320B. The control circuit re-converts the frequency of the light pulses emitted by the LED back to a current magnitude.

With reference to FIG. 15, capacitor C4, transistor Q1, resistor R5, and diode CR4 form a shunt regulator which provides a supply voltage of about 11 volts. The collector of Q1 is considered ground and the emitter is considered +Vcc.

The actual pulsed DC X-ray tube current flows between positive and negative terminals 319, 318, in alternative directions depending upon whether it is the positive half cycle or the negative half cycle that is, the rising edge or the falling edge of the pulsed DC waveform delivered by power supply 90. The tube current is steered through a parallel combination of capacitors C1, C2, C3, and then through a parallel combination of resistors R2, R3, R4, first in one direction and then in the other. During the charging half cycle, the path for the tube current is: from terminal 319 to transistor Q2, to resistors R2, R3, R4, to capacitors C1, C2, C3, to diode CR3, and to terminal 318. The voltage at terminal 319 is a ramp from about 3.1 volts to about 6.2 volts, at which time the discharging half cycle begins.

The path of the tube current during the discharging half cycle is: from terminal 319 to diode CR2, to transistor Q1, to capacitors C1, C2, C3, to resistors R2, R3, R4, to transistor Q3, and to terminal 318. During this half cycle the voltage at terminal 318 is a ramp from about 6.2 volts to about 3.1 volts.

A voltage reference (or threshold voltage) is established by another portion of the circuit. Operational amplifier U2 in conjunction with diode CR7, capacitor C8, resistors R12, R13, R11, R1 and capacitor C6 provide an adjustable but very stable voltage reference of about 6.2 volts.

The voltage reference is provided as one input to the aystable circuit U1. In essence, U1 functions as a comparator which compares the voltage across discharging capacitors R2, R3 and R4, which is representative of the tube current, with a voltage reference and generates an output current pulse for activating an LED when the ramp voltage at terminal 319 reaches the reference voltage. The output of the comparator also controls the state of transistors Q2 and Q3 which determine in which direction current flows through the capacitors C1, C2, C3 and resistors R2, R3, R4. Thus, the output of U1 at pin 3 goes high when the ramp voltage input received at pins 2 and 6 goes below one half of the reference voltage; this high output, via U3A and Q4 and Q5, turns Q2 on and Q3 off. The charging half cycle then occurs wherein the tube current flows from terminal 319 through Q2 to R2, R3, R4, to C1, C2, C3, to CR3, and to terminal 318. As the ramp voltage at terminal 319 increases to 6.2 volts, the output of U1 goes low and turns Q3 on, Q2 off, and provides a narrow pulse through U3B and U3C, U3D, U3E, U3F to furnish a pulse to the LED. The tube current then reverses, flowing from terminal 319 to CR2, to Q1, to C1, C2, C3, to R2, R3, R4, to Q3, and to terminal 318, discharging the voltage stored in the capacitors C1, C2, C3 across resistors R2, R3, R4.

Thus, the X-ray tube current alternately charges and discharges the three capacitors C1, C2, C3 from about 6.2 volts to about 3.1 volts and at the end of each charging cycle a pulse is generated. The frequency of these pulses is directly proportional to the X-ray tube current. For a particular embodiment of the circuit, an X-ray tube current of 1,000 ma gives a frequency of 500 kH. The pulses of light from the LED 327 are sensed by the photodiode 328 and processed by the low-voltage control circuit 320B to produce an output representing the magnitude of the tube current. This output is sent via terminal 55 on line 80 to input terminal 52 of computer 77; the computer uses this information to adjust the current in the cathode tube filament via filament drive 73.

Having described a limited number of embodiments of the present invention, it should now be apparent to those skilled in the art that numerous embodiments and modifications are contemplated as falling within the scope of the present invention as defined by the appended claims.

What is claimed is:

1. Apparatus for controlling an operating power supplied to an X-ray generating source, wherein during an exposure period the source projects X-ray radiation toward a patient, a portion of the radiation passing through the patient and being utilized to produce an image of the patient, the apparatus comprising:

a sensor having an input that receives the portion and an output that provides a measured radiation dosage signal representative thereof; and a power supply having an input that receives a power signal having an amplitude and an output that provides a high-voltage output signal for operating the X-ray generating source, the power supply including:

a regulator receiving the power signal and having a continuously variable resistance mechanism responsive to a feedback control signal to modify the amplitude of the power signal during the exposure period to produce the high-voltage output signal; and a control mechanism including:

means for calculating a projected density slope representing a target radiation dosage throughout the exposure period to optimize the image of the patient; and means for comparing the measured radiation dosage signal and the projected density slope to provide the feedback control signal such that the measured radiation dosage signal approximates the projected density slope.

2. The apparatus of claim 1, wherein the means for calculating includes means for determining the projected density slope such that the image approximates a 100% film density and the portion is minimized.

3. The apparatus of claim 2, wherein the means for determining includes:

means for specifying the exposure period and a predetermined X-ray generating source voltage; and means for deriving the projected density slope based on at least the exposure period and the predetermined X-ray generating source voltage.

4. The apparatus of any one of claims 1, 2, and 3, wherein the means for comparing includes means for providing the feedback control signal during an initial 10% of the exposure period.

5. The apparatus of claim 1 wherein the the means for calculating includes:

means for specifying the exposure period and a predetermined X-ray generating source voltage;

means for determining the projected density slope from at least the exposure period and the predetermined X-ray generating source voltage;

means for determining a sample time and a corresponding sample density based on the projected density slope, wherein the sample time is less than the exposure period;

means for monitoring, during the exposure period, an elapsed exposure time and an actual density represented by the measured radiation dosage signal; and means for recalculating the projected density slope when one of the elapsed exposure time and the actual density respectively equals the sample time and the sample density.

6. The apparatus of any one of claims 1 and 2, wherein the continuously variable resistance mechanism comprises a series of transistors.

7. The apparatus of claim 5, further comprising a protection circuit disposed between the regulator and the X-ray generating source to limit a rate of change of a transient high-voltage spike produced at the X-ray generating source and to protect the continuously variable resistance mechanism from damage.

8. The apparatus of claim 7, wherein the protection circuit includes means for preventing the high-voltage spike from reversing polarity.

9. A method of controlling an operating power supplied to an X-ray generating source, wherein during an exposure period the source projects X-ray radiation towards a patient, a portion of the radiation passing through the patient and being utilized to produce an image of the patient, the method comprising steps of: sensing the portion;

generating a radiation dosage signal representative of the portion;

calculating a projected density slope representing a target radiation dosage throughout the exposure period to optimize the image of the patient;

generating at least one feedback control signal, based on a comparison of the radiation dosage signal and the projected density slope;

controlling a high-voltage signal for operating the X-ray generating source, at least once during the exposure period, in response to the at least one feedback control signal, so that the radiation dosage signal approximates the projected density slope.

10. The method of claim 9, wherein the step of calculating includes a step of determining the projected density slope such that the image approximates a 100% film density and the portion is minimized.

11. The method of claim 9, wherein the step of calculating includes steps of:

specifying the exposure period and a predetermined X-ray generating source voltage; and determining projected density slope from at least the exposure period and the predetermined X-ray generating source voltage.

12. The method of claim 9, wherein the step of controlling the high-voltage signal is performed within an initial 10% of the exposure period.

13. The method of claim 12, further including steps of:

maintaining the high-voltage signal substantially constant after the initial 10% of the exposure period;

monitoring the radiation dosage signal after the initial 10% of the exposure period; and terminating the source when the radiation dosage signal indicates that the image approximates a 100% film density.

14. The method of claim 12, further including a step of terminating the source at a predetermined time after a predetermined nominal exposure time if the image does not approximate a 100% film density.

15. The method of claim 11, further including steps of:
specifying a sample time less than the exposure period and a corresponding sample density based on the projected density slope;
monitoring, during the exposure period, an elapsed exposure time and an actual density represented by the radiation dosage signal; and
recalculating the projected density slope when one of the elapsed exposure time and the actual density respectively equals the sample time and the sample density.

16. The apparatus of claim 1, wherein the regulator includes means for providing a voltage differential, based on the high-voltage output signal, across the continuously variable resistance mechanism, so that a first portion of the power signal is dissipated in the continuously variable resistance mechanism while a second portion of the power signal is provided as the high-voltage output signal to the X-ray generating source.

17. The apparatus of claim 6, wherein the series of transistors includes a plurality of high voltage power zener devices with two terminal isolation.

18. The apparatus of claim 6, wherein the regulator includes:
means for providing a total voltage differential, based on the high-voltage output signal, across the controlled variable resistance mechanism; and
means for controlling the series of transistors so that each of the transistors in the series has an individual voltage differential substantially equal to the individual voltage differential of another of the transistors in the series, wherein the series of transistors is arranged so that the total voltage differential is substantially equal to a sum of the individual voltage differentials.

19. The method of claim 9, wherein the step of controlling includes steps of:
receiving an input power signal; and
regulating the input power signal, in response to the at least one feedback control signal, such that a first portion of the input power signal is dissipated while a second portion of the input power signal is provided as the high-voltage signal to the X-ray generating source.

20. The method of claim 19, wherein the step of regulating includes steps of:
supplying a total voltage differential, based on the high-voltage signal, across a series of transistors; and
controlling the series of transistors so that each of the transistors of the series has an individual voltage differential such that the sum of the individual voltage differentials substantially equals the total voltage differential.

21. The method of claim 20, wherein the step of controlling the series includes a step of controlling each of the transistors of the series to have substantially equal individual voltage differentials.

22. A method for controlling an X-ray tube to expose a patient to a radiation dosage for an exposure period, comprising steps of:
calculating a projected density slope representing a desired radiation dosage throughout the exposure period to optimize an image of the patient;
initiating the exposure period by applying a voltage to the X-ray tube such that the patient is exposed with radiation from the X-ray tube and a portion of the radiation passes through the patient;
measuring a portion radiation dosage corresponding to the portion during the exposure period; and
adjusting the voltage applied to the X-ray tube at least once during the exposure period so that the portion radiation dosage approximates the projected density slope.

23. The method of claim 22, wherein the step of measuring includes steps of:
specifying a sampling time and a corresponding sampling dosage based on the projected density slope, wherein the sampling time is less than the exposure period; and
measuring the portion radiation dosage at the sampling time at least once during the exposure period,
and wherein the step of adjusting includes steps of:
monitoring an elapsed exposure time from the application of the voltage to the X-ray tube;
increasing the voltage applied to the X-ray tube if the elapsed exposure time is equal to the sampling time and the portion radiation dosage is less than the sampling dosage; and
decreasing the voltage applied to the X-ray tube if the portion radiation dosage equals the sampling dosage and the elapsed exposure time is less than the sampling time.

24. The method of claim 22, wherein the step of calculating includes steps of:
specifying an initial X-ray tube voltage;
specifying the exposure period;
determining a projected image density corresponding to the initial X-ray tube voltage based on an interpolation from a table of density versus tube voltage measurements; and
determining the projected density slope from the projected image density and the exposure period.

25. The method of claim 23, further including steps of:
specifying a number of portion radiation dosage measurements during an exposure period, wherein each measurement occurs at the sampling time;
recalculating the projected density slope after each measurement, wherein the recalculated projected density slope is based on at least the adjusted voltage; and
repeating the steps of monitoring, increasing and decreasing for each measurement.

26. The method of claim 22, wherein the step of adjusting is completed within an initial 10% of the exposure period.

27. An apparatus for controlling an X-ray tube to expose a patient to a radiation dosage for an exposure period, comprising:
means for calculating a projected density slope representing a desired radiation dosage throughout the exposure period to optimize an image of the patient;
means for initiating the exposure period including means for applying a voltage to the X-ray tube such that the patient is exposed with radiation from the X-ray tube and a portion of the radiation passes through the patient;
means for measuring a portion radiation dosage corresponding to the portion during the exposure period; and
means for adjusting the voltage applied to the X-ray tube at least once during the exposure period so that the portion radiation dosage approximates the projected density slope.

28. The apparatus of claim 27, wherein the means for measuring includes:
means for specifying a sampling time and a corresponding sampling dosage based on the projected density slope, wherein the sampling time is less than the exposure period; and means for measuring the portion radiation dosage at the sampling time at least once during the exposure period, and wherein the means for adjusting includes:

means for monitoring an elapsed exposure time from the application of the voltage to the X-ray tube;

means for increasing the voltage applied to the X-ray tube if the elapsed exposure time is equal to the sampling time and the portion radiation dosage is less than the sampling dosage; and means for decreasing the voltage applied to the X-ray tube if the portion radiation dosage equals the sampling dosage and the elapsed exposure time is less than the sampling time.

29. The apparatus of claim 27, wherein the means for calculating includes:

means for specifying an initial X-ray voltage;

means for specifying the exposure period;

means for determining a projected image density corresponding to the initial X-ray tube voltage based on an interpolation from a table of density versus tube voltage measurements; and means for determining the projected density slope from the projected image density and the exposure period.

30. The apparatus of claim 28, further including:

means for specifying a number of portion radiation dosage measurements during an exposure period;

means for making each measurement at the sampling time;

means for recalculating the projected density slope after each measurement, wherein the recalculated projected density slope is based on at least the adjusted voltage from a previous measurement; and means for additionally adjusting the voltage after each measurement based on the recalculated projected density slope.

31. The apparatus of claim 27, wherein the means for adjusting includes means for completing an adjustment of the voltage within an initial 10% of the exposure period.

32. A method for controlling an X-ray generating source, comprising steps of:

calculating a projected density slope representing a target radiation dosage throughout an exposure period to optimize an image of a patient;

exposing the patient to radiation from the source for the exposure period;

measuring an actual radiation dosage representing a portion of the radiation passing through the patient during the exposure period; and controlling the source at least once during the exposure period so that the actual radiation dosage approximates the projected density slope.

33. An X-ray apparatus, comprising:

a calculator to calculate a projected density slope representing a target radiation dosage throughout an exposure period to optimize an image of a patient;

an X-ray source to expose the patient to radiation;

a dose meter to measure an actual radiation dosage representing a portion of the radiation passing through the patient; and an X-ray source controller to compare the projected density slope and the actual radiation dosage and to control the source at least once during the exposure period so that the actual radiation dosage approximates the projected density slope.

* * * * *